United States Patent
Zhang et al.

(10) Patent No.: US 9,201,868 B1
(45) Date of Patent: Dec. 1, 2015

(54) SYSTEM, METHODS AND USER INTERFACE FOR IDENTIFYING AND PRESENTING SENTIMENT INFORMATION

(71) Applicants: Guangsheng Zhang, Palo Alto, CA (US); Chizhong Zhang, Palo Alto, CA (US)

(72) Inventors: Guangsheng Zhang, Palo Alto, CA (US); Chizhong Zhang, Palo Alto, CA (US)

( * ) Notice: Subject to any disclaimer, the term of this patent is extended or adjusted under 35 U.S.C. 154(b) by 331 days.

(21) Appl. No.: 13/794,800

(22) Filed: Mar. 12, 2013

Related U.S. Application Data

(63) Continuation-in-part of application No. 13/709,827, filed on Dec. 10, 2012.

(60) Provisional application No. 61/568,657, filed on Dec. 9, 2011.

(51) Int. Cl.
  *G06F 17/27* (2006.01)
  *G06F 17/28* (2006.01)

(52) U.S. Cl.
  CPC .................... *G06F 17/28* (2013.01)

(58) Field of Classification Search
  None
  See application file for complete search history.

(56) References Cited

U.S. PATENT DOCUMENTS

| | | | |
|---|---|---|---|
| 7,702,611 B2 | 4/2010 | Chi | |
| 7,912,705 B2* | 3/2011 | Wasson et al. | 704/9 |
| 7,930,302 B2 | 4/2011 | Bandaru | |
| 8,265,925 B2* | 9/2012 | Aarskog | 704/9 |
| 8,996,648 B2* | 3/2015 | Archambault et al. | 709/217 |
| 2003/0217052 A1* | 11/2003 | Rubenczyk et al. | 707/3 |
| 2005/0071150 A1* | 3/2005 | Nasypny | 704/9 |
| 2005/0108630 A1* | 5/2005 | Wasson et al. | 715/513 |
| 2007/0061717 A1 | 3/2007 | Cragun | |
| 2011/0131093 A1* | 6/2011 | Behroozi et al. | 705/14.52 |
| 2011/0313757 A1* | 12/2011 | Hoover et al. | 704/9 |
| 2012/0245923 A1* | 9/2012 | Brun | 704/9 |
| 2013/0173254 A1* | 7/2013 | Alemi | 704/9 |
| 2013/0179423 A1* | 7/2013 | Gur et al. | 707/710 |
| 2014/0188457 A1* | 7/2014 | Fink et al. | 704/9 |
| 2014/0188459 A1* | 7/2014 | Fink et al. | 704/9 |
| 2014/0278365 A1* | 9/2014 | Zhang et al. | 704/9 |
| 2014/0316768 A1* | 10/2014 | Khandekar | 704/9 |

* cited by examiner

*Primary Examiner* — Satwant Singh

(57) ABSTRACT

A system, methods and user interface are disclosed for determining the connotation or sentiment type of a text unit comprising multiple terms and with a grammatical structure, such as subject+verb, verb+object, adjective+noun, noun+noun, noun+preposition+noun, and for highlighting or extracting such text units. The connotation or sentiment type of the text unit is determined by applying context rules where the context of the grammatical structure may change the inherent or default connotations of individual terms in the text unit. The methods provide a solution to the challenge of correctly or accurately determining the sentiment type of various linguistic structures under different context, and to the simplistic approach of using the inherent connotation of individual terms for the linguistic structure containing such terms, and highlighting only such terms without considering the contextual effects.

20 Claims, 24 Drawing Sheets

Figure 2

Over-the-counter drugs

Aleve
Alternagel
Bayer
Dramamine
Excedrin
Tylenol
..
...
..
Xylocaine
...
...
...

Hotel ABC

| | | |
|---|---|---|
| ☐ | Show all comments | 910 |
| ☒ | Show positive comments only | |
| ☐ | Show negative comments only | |

Major topics:

Room is good ........................................Link1, Link2
      fantastic......................................Link2
      very clean..................................Link 3
      ……see more….

Bathroom spacious ....................................Link 2, Link 3
      amazing tub................................Link1
      with a nice deep tub.....................Link 4
      ……see more…..

Bed
……………

More topics….

Figure 9A

Hotel ABC

| | | |
|---|---|---|
| ☐ | Show all comments | 910 |
| ☐ | Show positive comments only | |
| ☒ | Show negative comments only | |

Major topics:

Room not so great ................................Link1, Link2
      not good for the price .....................Link1
      ……see more….

Bathroom was not cleaned well .......................Link2

……see more…..

Bed
      too hard.............................................Link 5

…..see more….

More topics….

View comments by topics:

Room

Bathroom

Bed

Service

Pool

More topics….

Figure 10B

View comments by topics:

Room is good …………………………………Link1, Link2
    fantastic……………………………….Link2
    very clean……………………………Link 3
    ……see more….

Bathroom spacious ……………………………Link 2, Link 3
    amazing tub…………………………..Link1
    with a nice deep tub………………….Link 4
    ……see more…..

Bed

…………….

More topics….

🔍 text-processing.com/demo/sentiment/

Sentiment Analysis with Python NLTK Text Classification

This is a demonstration of sentiment analysis using a NLTK 2.0.4 powered text classification process. It can tell you wh the text you enter below expresses *positive sentiment*, *negative sentiment*, or if it's *neutral*. Using hierarchical classif *neutrality* is determined first, and *sentiment polarity* is determined second, but only if the text is not neutral.

Analyze Sentiment

Language
english ▾

Enter text
```
the price is pretty high
```

Enter up to 50000 characters

Analyze

Sentiment Analysis Results

The text is pos

The final sentiment is determined by looking at the cla probabilities below.

Subjectivity
- neutral: 0.2
- polar: 0.8

Polarity
- pos: 0.6
- neg: 0.4

Figure 21

SYSTEM, METHODS AND USER INTERFACE FOR IDENTIFYING AND PRESENTING SENTIMENT INFORMATION

CROSS REFERENCES TO RELATED APPLICATIONS

The present application is a Continuation in Part of and claims priority to U.S. patent application Ser. No. 13/709,827 entitled "SYSTEM, METHODS AND USER INTERFACE FOR DISCOVERING AND PRESENTING INFORMATION IN TEXT CONTENT", filed on Dec. 10, 2012. U.S. patent application Ser. No. 13/709,827 further claims priority to U.S. Provisional Patent Application 61/568,657 entitled "SYSTEM, METHODS, AND USER INTERFACE FOR ORGANIZING DOCUMENT CONTENTS INTO A HIERARCHICAL STRUCTURE AND SELECTIVE HIGHLIGHTING OF TERMS" filed by the present inventor on Dec. 9, 2011. The disclosures of the above application are incorporated herein by reference.

The present application also make references to U.S. patent application Ser. No. 12/782,545, entitled "SYSTEM AND METHODS FOR AUTOMATED DOCUMENT TOPIC DISCOVERY, BROWSABLE SEARCH AND DOCUMENT CATEGORIZATION" filed on May 18, 2010 by the present inventor. U.S. patent application Ser. No. 12/782,545 further claims priority to U.S. patent application Ser. No. 12/715,385, titled "SYSTEM AND METHODS FOR AUTOMATED DOCUMENT TOPIC DISCOVERY, BROWSABLE SEARCH AND DOCUMENT CATEGORIZATION", filed on Mar. 2, 2010. U.S. patent application Ser. No. 12/715,385 claims priority to U.S. Provisional Patent Application 61/160,625, titled "SYSTEM, METHODS, USER INTERFACE, AND ARTICLE OF MANUFACTURE FOR SCALABLE KNOWLEDGE-BASED DOCUMENT TOPIC DISCOVERY, CONTENT RECOGNITION, SEARCH, RANKING, AND CATEGORIZATION", filed by the present inventor on Mar. 16, 2009, and U.S. Provisional Patent Application 61/298,422, titled "SYSTEM AND METHODS FOR AUTOMATED DOCUMENT TOPIC DISCOVERY, BROWSABLE SEARCH AND DOCUMENT CATEGORIZATION", filed by the present inventor on Jan. 26, 2010.

The present application also makes references to U.S. patent application Ser. No. 13/707,940 titled "AUTOMATED TOPIC DISCOVERY IN DOCUMENTS AND CONTENT CATEGORIZATION", filed on Dec. 7, 2012. U.S. patent application Ser. No. 13/707,940 further claim priority to U.S. Provisional Patent Application 61/682,205 titled "SYSTEM AND METHODS FOR DETERMINING TERM IMPORTANCE AND RELEVANCE BETWEEN TEXT CONTENTS USING CONCEPTUAL ASSOCIATION DATASETS" filed on Aug. 11, 2012, and U.S. patent application Ser. No. 13/655,415 entitled "SYSTEM AND METHODS FOR DETERMINING RELEVANCE BETWEEN TEXT CONTENTS" filed by the present inventor on Oct. 18, 2012, and U.S. Provisional Patent Application 61/568,657 entitled "SYSTEM, METHODS, AND USER INTERFACE FOR ORGANIZING DOCUMENT CONTENTS INTO A HIERARCHICAL STRUCTURE AND SELECTIVE HIGHLIGHTING OF TERMS" file by the present inventor on Dec. 9, 2011, and U.S. patent application Ser. No. 12/972,462 entitled "AUTOMATED TOPIC DISCOVERY IN DOCUMENTS" filed by the present inventor on Dec. 18, 2010. U.S. patent application Ser. No. 12/972,462 further claims priority to U.S. Provisional Patent Application 61/299,823, titled "SYSTEM AND METHODS FOR AUTOMATED DOCUMENT TOPIC DISCOVERY, BROWSABLE SEARCH, RELEVANCE RANKING, SUMMARY GENERATION AND DISPLAY", filed by the present inventor on Jan. 29, 2010, U.S. Provisional Patent Application 61/306,523, titled "SYSTEM AND METHODS FOR EFFICIENT EMAIL INDEXING, SEARCH, AND STORAGE", filed by the present inventor on Feb. 21, 2010, and U.S. Provisional Patent Application 61/306,524, titled "SYSTEM, METHODS, AND USER INTERFACE FOR EXTRACTING AND DISPLAYING SYMBOLIC ELEMENTS FROM USER-CREATED CONTENTS", filed by the present inventor on Feb. 21, 2010. The disclosures of the above applications are incorporated herein by reference.

BACKGROUND OF THE INVENTION

In sentiment or opinion analysis, conventional approaches and applications currently in the market often produce too many incorrect results, partly due to the complexity in human language communications. One apparent problem with many conventional approaches is that words or phrases in user expressions are looked at without sufficient contextual analysis, due to the difficulties in performing such analysis and the lack of advanced natural language technologies.

For example, in identifying the sentiment type of the expression "Their price is pretty high", many approaches may only look at the individual words in isolation, and identify the expression as reflecting a positive sentiment due to the presence of the word "pretty", without also looking at the context of the word "pretty", or without understanding the relationships between the words "price" and "high", and between "pretty and "high". Many systems also highlight words or phrases that are perceived to have either a positive or negative opinion or sentiment type for the purpose of better information presentation. However, without more advanced technologies and methods, the quality of the results is generally not up to the expectations yet, and the accuracy can often be too low to serve practical purposes.

Many words or phrases in a language carry positive or negative or neutral connotations, and can be used to express an opinion or feeling. For example, the word "good" usually carries a positive opinion, and the word "bad" usually carries a negative opinion. However, user expressions as linguistic units are not simple collections of individual words, and words or phrase that can carry either positive or negative opinions are not limited to such simple words like "good" or "bad". Meanings or information carried in natural language contents have internal structures, and most of the time, the inherent meanings of individual words or phrase are changed in various context.

For example, to many users of the English language, the word "high" has an inherent positive connotation to a certain degree, such as when used in expressions like "the quality is high", and the word "low" has an inherent negative connotation to a certain degree, such as when used in expressions like "the quality is low". However, the inherent connotations of being either positive or negative can have an opposite manifestation under a different context. For example, in expressions like "high price", the connotation of the phrase is usually perceived as being negative even though the word "high" has a positive inherent connotation or opinion type, as well as in other expressions like "high blood pressure", or "high cholesterol", etc.

Other more intriguing examples of different contexts changing the inherent connotations of a word or phrase can include expressions with the English word "prevent" or "prevention". When used alone, such as in the name of a magazine named "Prevention", or in expressions such as "prevent the disease", the word "prevent" or "prevention" carries a positive connotation or meaning. However, there are cased these words are used in different context such as in "The lack of resources prevented them from making timely progresses", or "That condition prevented them from benefiting from the new policies", etc.

Conventional approaches in sentiment analysis are not able to handle such contextual changes of opinion types or connotations. One example of such a problem with the conventional approach is exhibited when using the open source tool kit known as NLTK (http://text-processing.com/demo/sentiment), at the time of this writing, the output of the tool kit for expressions like "the price is pretty high", etc, consistently produce an opinion type of being positive (probably due to the assumed positive connotation of the word of "high" or "pretty", as is shown in FIG. 21. In a commercially available website (http://www.lexalytics.com/web-demo) where a sentiment analysis demo is available, the analysis for the same expression produced the same results, as is shown in FIG. 22. Furthermore, conventional approaches are often limited to a dictionary lookup method to retrieve the default sentiment type of a word or phrase and then use them as is in different expressions. Such conventional approaches are generally unable to perform the contextual analysis to accurately determine the true connotations or sentiment type of the expressions being analyzed due to the complexity of the internal structures of linguistic expressions.

SUMMARY OF THE INVENTION

The present invention provides a system and methods for conducting contextual analysis of linguistic expressions to determine the contextually appropriate connotations or opinion or sentiment types of various user expressions, and user interface for presenting such information for more efficient information utilization.

The present application is a Continuation-in-Part application of the parent patent application for systems, methods and user interface for mining and presenting various types of information from unstructured text data, including the text data that carries sentiment information. For ease of reference, the content of the parent application is retained in its entirety below. The additional invention in the present disclosure includes system and methods and user interface for determining the contextualized connotation, or the sentiment or opinion type of a text unit comprising multiple terms and having a grammatical structure. Various methods are disclosure to cover a wide variety of linguistic structures that are common in everyday language use, and contextual rules are provided to accurately determine the connotation or sentiment type under various contexts that can change the inherent connotation of individual words or phrases.

In a general aspect, grammatical attributes that are associated with terms in a text unit are identified. The text units are a linguistic structure comprising two or more terms forming certain grammatical relationships. The grammatical attributes can include the grammatical roles of a term such as a subject, an object, a head of a phrase, a modifier of a phrase head, etc., and their parts of speech including a noun, a verb, an adjective, adverb, a preposition, etc.

In addition to grammatical attributes, the default or inherent connotations of the terms in terms of carrying an opinion, or sentiment type, are identified. Depending on the specific context and the types of the linguistic structures in the text unit, various algorithmic rules are defined for the determination of the resulting connotation or sentiment type of the text unit as a whole given the grammatical attributes and the default connotation of the terms in the text unit.

In another general aspect, terms in a language are organized into groups based on their semantic or conceptual attributes or characteristics. Contextual rules are defined for determining the connotation of the text unit as a whole based on the group memberships of the terms in the text unit, as well as the default connotations associated with the terms.

A system and user interface is provided for highlighting or selectively highlighting or extracting the part of the text that has a structure or a context scope, and carry a positive or negative opinion or sentiment type.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The original drawings in the parent patent application of the present application are retained. New drawings are added following the original sequence, starting from FIG. 13.

FIG. 2 is an example of a dataset of terms that share the semantic attribute of being "over-the-counter drug names" in accordance with the present invention.

FIGS. 9A and 9B are examples of selectively displaying extracted terms with a specific semantic attribute in accordance with the present invention.

FIGS. 10A and 10B illustrate an example of a user interface for selectively displaying extracted terms relevant to a topic in accordance with the present invention.

FIG. 21 is a screenshot of an open-source natural language processing web site showing a demo result using an approach in the current market.

DETAILED DESCRIPTION OF THE INVENTION

The first part of the following content is the content from the parent patent application of the present invention, and is retained in its entirety for ease of reference. The new contents are appended to the original content.

The present invention provides a system and methods for discovering information in a text content, and provides users with interface objects to act on the discovered information, such as extracting, displaying or hiding, or highlighting or un-highlighting words or phrases in a text content as needed to aid information handling.

In U.S. Provisional Patent Application 61/568,657 entitled "System, Methods, and User Interface for Organizing Document Contents into a Hierarchical Structure and Selective Highlighting of Terms" filed by the present inventor on Dec. 9, 2011, methods are disclosed for discovering information in unstructured or dispersed text data, and for organizing and presenting the discovered information in a novel hierarchical structure format.

In one embodiment, the prominence of a term in the text content is first determined based on its grammatical role and other context information in the content. For example, a word or a phrase that is the subject of a sentence is assigned more prominence value than a word or a phrase in the other part of a sentence. In addition to the grammatical roles, other factors can also be used to determine the prominence score for each term in the content, and terms that have a high score can be extracted from the text content for various uses. They can be separately displayed in a user interface as the topic terms of the content to serve as tags or summaries of the content, or can be further used to build a hierarchical structure to organize and present the key information in the content in a novel and effective way.

The detailed methods for obtaining such a term prominence or tem importance score are disclosed in U.S. patent application Ser. No. 12/972,462 entitled "Automated Topic Discovery in Documents" filed by the present inventor on Dec. 18, 2010, and US Provisional Patent Application 61/299,823, entitled "System and methods for automated document topic discovery, browsable search, relevance ranking, summary generation and display", filed by the present inventor on Jan. 29, 2010, and U.S. patent application Ser. No. 12/782,545, entitled "SYSTEM AND METHODS FOR AUTOMATED DOCUMENT TOPIC DISCOVERY, BROWSABLE SEARCH AND DOCUMENT CATEGORIZATION" filed on May 18, 2010 by the present inventor, and U.S. patent application Ser. No. 13/707,940 titled "AUTOMATED TOPIC DISCOVERY IN DOCUMENTS AND CONTENT CATEGORIZATION", filed on Dec. 7, 2012. The disclosures of the above applications are incorporated herein by reference.

Figure 8:
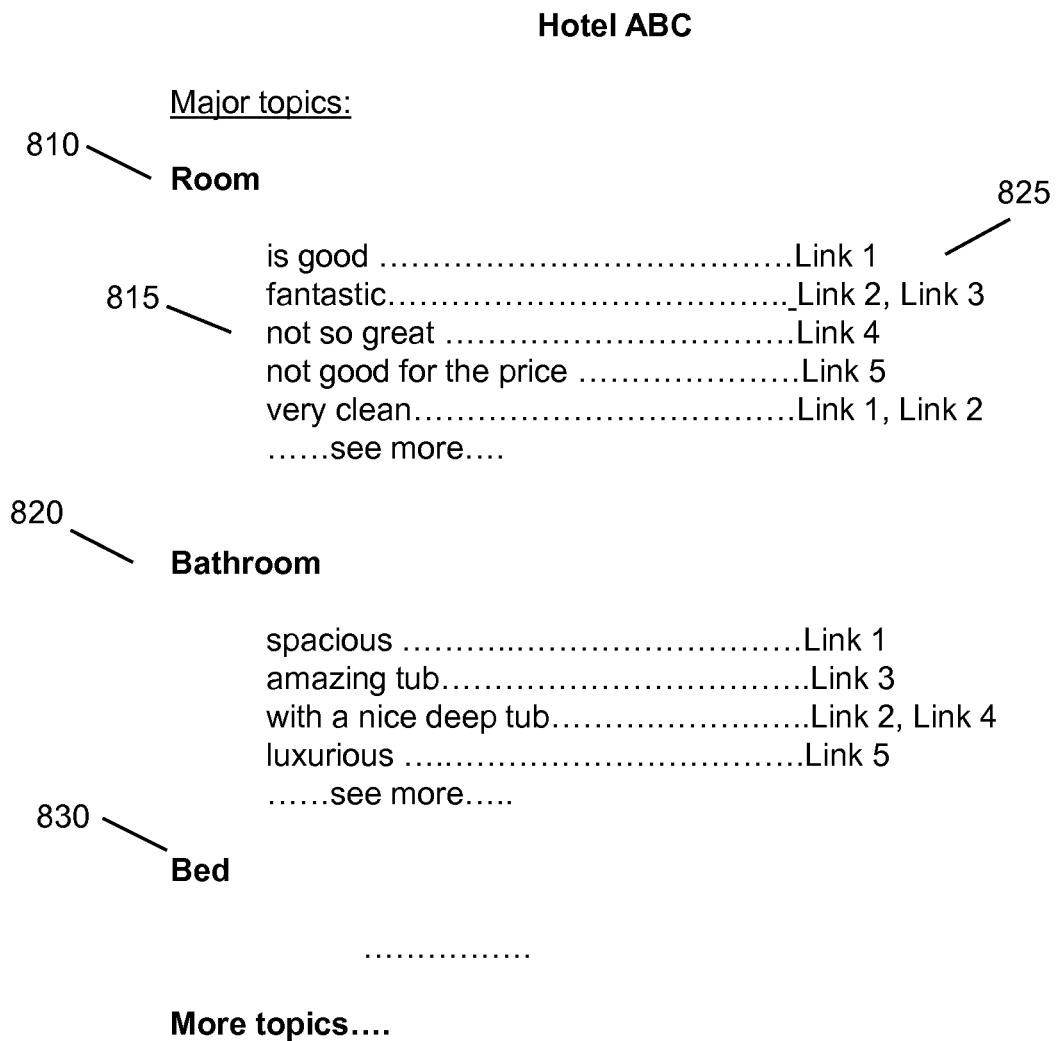
FIG. 8 is an example of a hierarchical information display format with comment terms carrying user opinions in accordance with the present invention.

In the referenced disclosure of U.S. Provisional Patent Application 61/568,657 entitled "System, Methods, and User Interface for Organizing Document Contents into a Hierarchical Structure and Selective Highlighting of Terms" filed by the present inventor on Dec. 9, 2011, one focus is on extracting the key information from a large amount of data, such as hundreds or thousands of user reviews on a hotel or a restaurant, and to present such key information in an easy-to-read format. One example of such a structure is illustrated in FIG. 8, and for ease of illustration, is herein referred to as a topic tree, and will be described later. The purpose of the disclosed methods is to provide a solution to the problem of information overload faced by readers. An ordinary reader is usually not able to quickly find information about particular aspects of a hotel or a restaurant from such a large amount of dispersed data from a brief reading.

In addition to identifying and extracting the key information and presenting such information in various formats (such as a topic tree structure shown in FIG. 8), other methods and user interface objects are also disclosed in the above referenced disclosure for presenting the identified or extracted information in a more effective way, such as selectively displaying or hiding certain terms in the hierarchical topic tree structure, or selectively highlighting terms representing specific types of information in the original text content.

In the present disclosure, the focus is on more generalized methods for identifying and selectively extracting, displaying, or highlighting certain parts of a text content based on specific attributes of the terms in the text content, for more effective reading and information management.

Figure 1:
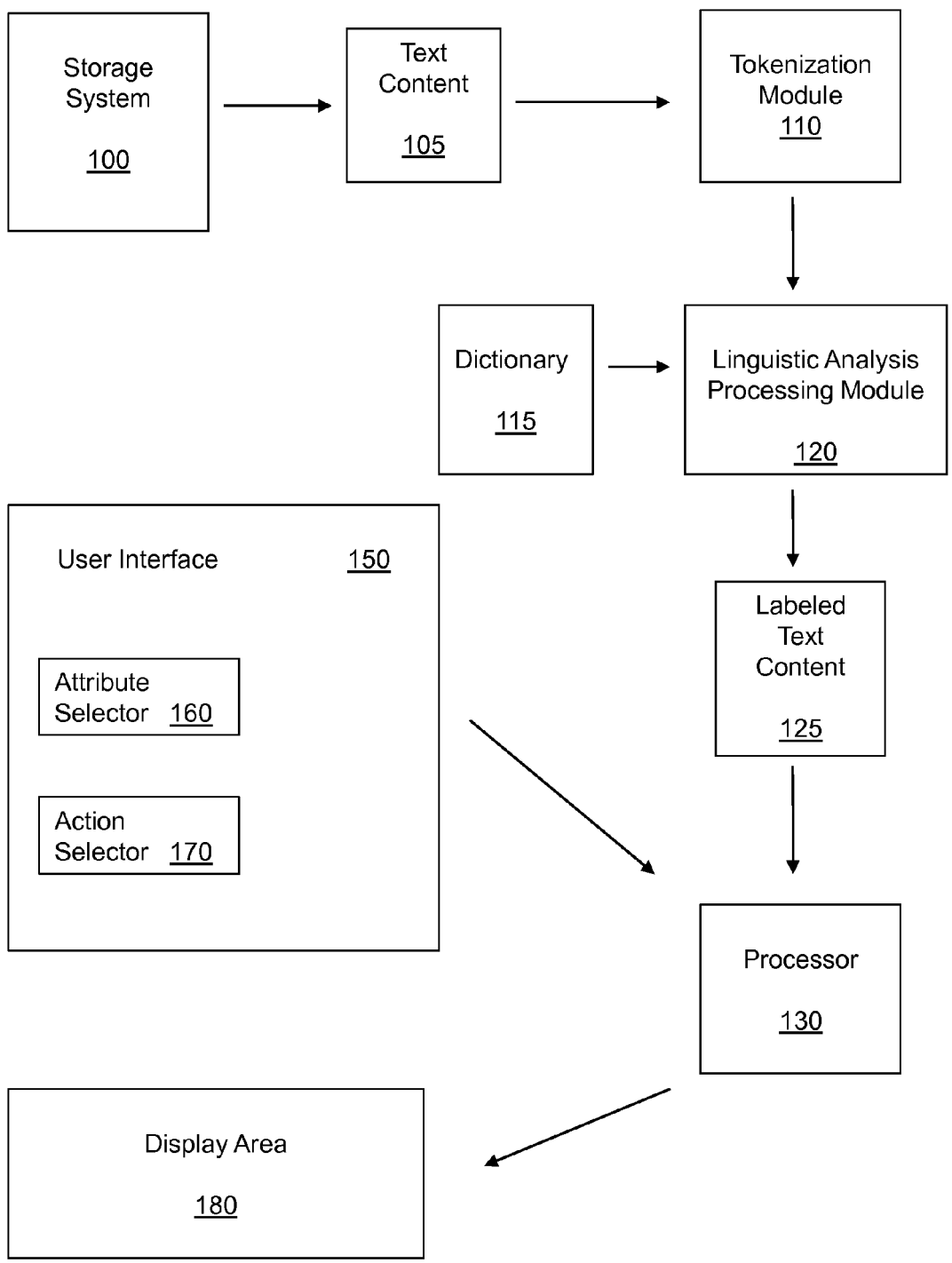
FIG. 1 is an illustration of a system of modules to allow a user to selectively act on the terms in a text content in accordance with the present invention.

FIG. 1 is a system diagram illustrating the general functional components and steps of one embodiment of the present invention.

In FIG. 1, a text content 105, such as a document of any type, is obtained by the system from a computer storage 100, or optionally from a user interface. The text content is then tokenized to produce a plurality of tokens by the tokenization module 110, each of which can be a word or a phrase. In a general sense, a token can be an instance of a term that can have more than one token in the text content, for example, the word "good" may occur in more than one time in the content, and each occurrence is a token instance of the term "good".

Next, a linguistic analysis is performed by the linguistic processing module 120 to identify the grammatical or semantic or contextual attributes of the tokens. In some embodiments, a parser of certain type can be used for the analysis. The parser can use a dictionary 115 to aid its analysis. In some other embodiments, certain attributes can also be directly obtained by a dictionary lookup. The linguistic analysis can also detect the topics contained in the content based on the grammatical or semantic or other attributes of the terms in the content, and associate the content with a specific topic domain, and retrieve additional domain-specific dictionaries or datasets for further processing.

Then, the grammatical, semantic, contextual, or topical attributes obtained from either the parser, or direct dictionary lookup can be attached to the tokens in the text content to form labeled text content 125.

In some embodiments, the attributes attached to the term are embedded in the text content by a pre-processing step, such that words or phrases in the text content are labeled with their attributes in a certain way that can be interpreted by a display tool such as a web browser or other document viewers. In some other embodiments, the attributes are assigned to the words or phrases in the text content by the central processor in real-time when receiving a user indication.

Furthermore, the user interface objects provided by the system can display one or more attributes or a description of the attributes in user interface 150 to the user, and for the user to select for an action, and attribute selector 160 accepts the user selection as input to the system. Such attributes can be grammatical, semantic, contextual, or topical, etc.

Another user interface object such as action selector 170 provides choices of supported actions to the user, and accepts the user selection as input to the system. The choices of actions provided to the user can include extracting, displaying or hiding, or highlighting the terms or tokens in the content that have the selected attributes.

In some embodiments, the two types of selectors 160 and 170 can be combined or integrated into a single user interface object. For example, users can act on a button labeled "extract terms that are drug names", in which the "extract" is an action, and "drug names" is an attribute or attribute name.

When a user selects an attribute and an action, the selections are registered by processor 130, which retrieves the labeled text content if the text has been pre-processed and displays the results in display area 180. In some embodiments, processor 130 can register the user selections and send the selection information to linguistic analysis processing module 120 to perform the desired actions on the text content in real-time, and the results are then displayed in area 180.

In some embodiments, a dictionary can be used to lookup the grammatical or semantic or other attributes of a term in the linguistic analysis.

FIG. 2 illustrates an example of such a dictionary that can contain words or phrases that are names of some over-the-counter drugs, or have the semantic attribute of being the names of "over-the-counter drugs".

Such a dictionary or word list can be compiled either manually or automatically or semi-automatically using a machine-learning method of certain type. In the real world, text documents are most of the time associated with a specific domain, or a topic domain, such as politics, finance, medicine, law, technology, education, commerce, product/service review, restaurants, hotels and lodging, etc., and each domain can have its own domain-specific dictionaries compiled and stored in accessible databases. When text contents are displayed to the user, the user interface object such as the ones described above can also be made available to the user, and the user can select an attribute-based criterion and then perform a selective action on the terms in the content as an efficient way of discovering and locating needed information.

In some embodiments, the text content is first analyzed to determine its topics based on the terms used in the content, such as using the topic discovery methods disclosed in the referenced disclosures, and then the content is associated with a topic domain based on the major topics in the text content. A domain-based dictionary or word list for one or more pre-defined or desired semantic attributes can be pre-compiled, and stored in an accessible database or knowledge base, which can be stored either locally or on a remote or cloud-based computing and storage systems.

In some embodiments, the system stores certain domain-specific dictionary datasets, each containing terms that are associated with one or more domain-specific attributes, such as the attributes related to the medical or legal domain. In some other embodiments, the system can store a wide range of dictionary datasets across multiple domains to serve general requests.

When a dictionary or word list for semantic attributes of terms is available for the domain that the text content is associated with, the system can retrieve such datasets, and perform a match for each term in the dictionary or for each term in the text content, and the user-selected action can be performed on the matched terms, whether the action is to extract the terms, or to display or hide the terms, or to highlight or un-highlight the terms in the content.

Selectively Extracting Terms Based on Term Importance

Figure 3:
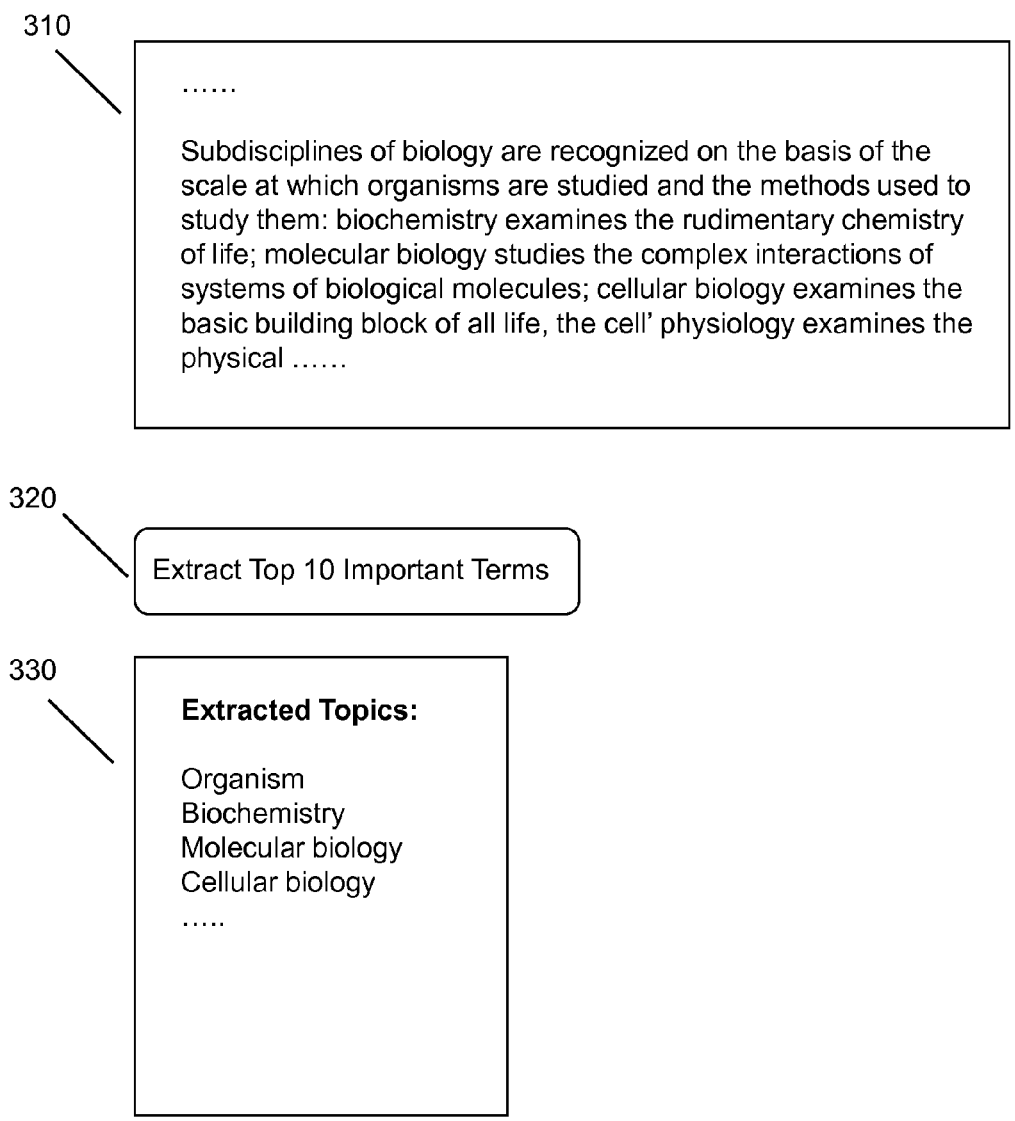
FIG. 3 is an illustration of a user interface that allows a user to selectively extract and display important terms that represent the topics of a text content in a list format in accordance with the present invention.

In one embodiment, the linguistic processing module can assign importance scores to the terms in the content based on the grammatical, or semantic, or contextual attributes of the token instances of the term. In this embodiment, terms with an importance score above a threshold can be extracted to represent the main topics of the content, such as the top 10 terms that have the highest score among all the terms in the content. FIG. 3 illustrates an example of the embodiment. 310 is an exemplar text content about biology, and terms such as "molecular biology", "cellular biology", "organism", "biochemistry", etc., are identified by the linguistic processing module as important terms in the content. One or more user interface objects can be used to display a selectable criterion together with an action, or display them separately. 320 is a selectable buttons to allow the user to select either "extract top 10 important terms", or "display top 10 important terms separately", etc. In this example, the important terms are extracted and displayed in a separate area 330 in a list format in connection with the original content. This way, users may only need to take a look at the important terms before deciding whether to spend more time to read the entire content.

The detailed steps in assigning importance scores to terms in the content are disclosed in the above-mentioned referenced disclosures, and are not the focus of the present disclosure. As has been described above, the focus of the present invention is to provide a system and methods and user interface for such selected actions on specific terms in a text content that meet a specified attribute-based criterion.

Figure 4:
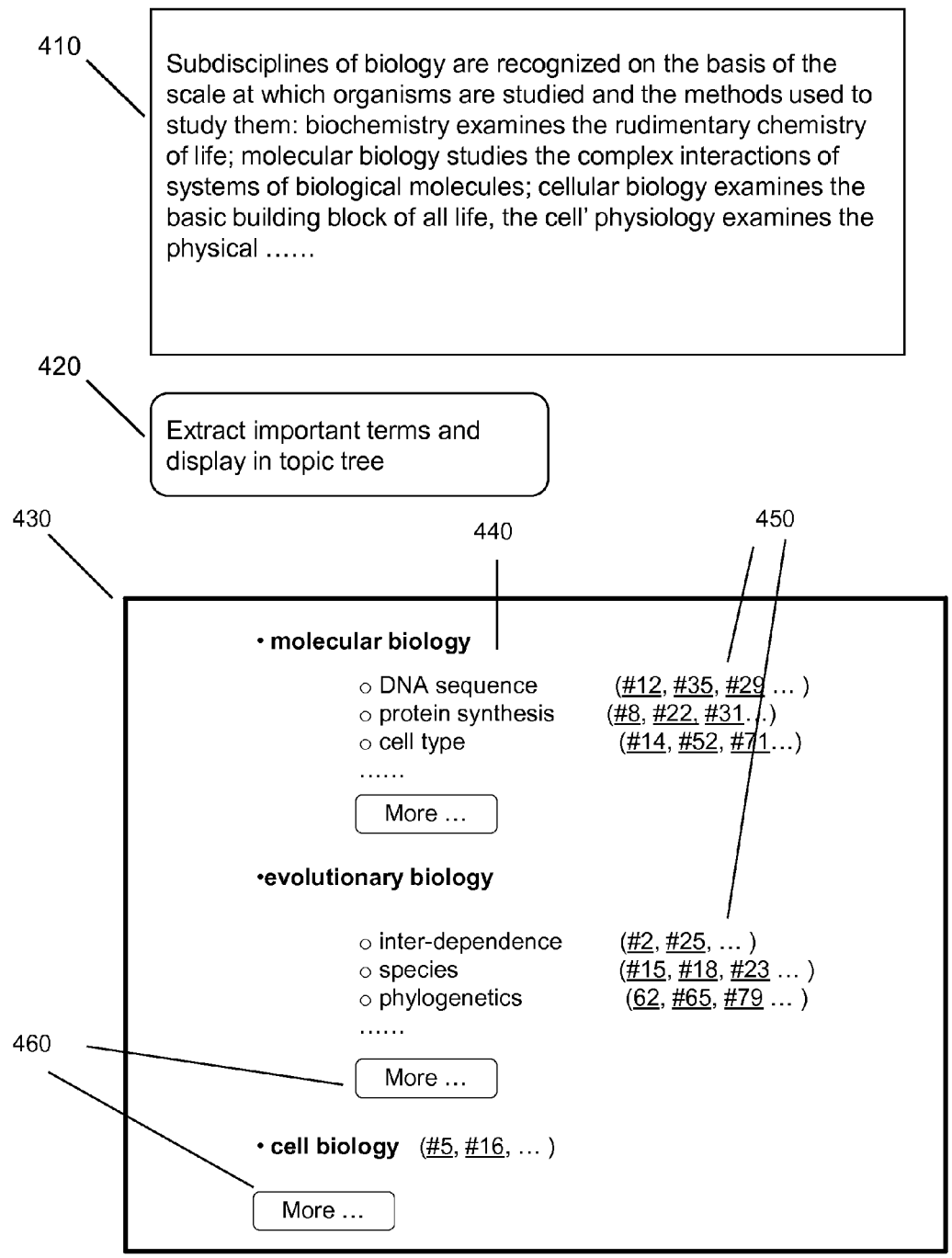
FIG. 4 is an illustration of a user interface that allows a user to display the extracted terms in a topic tree format in accordance with the present invention.

As is disclosed in the referenced disclosures, important terms of a text content can be extracted and further used to create a topic tree such as the one illustrated in FIG. 4. While the detailed steps in creating such a topic tree is disclosed in the referenced disclosures, the present invention provides additional methods and user interface objects to enable users to selectively display part of a topic tree as a novel format of presenting the key information in the content.

FIG. 4 is an example illustrating the user interface for users to select an action of extracting important terms and display a topic tree or display the extracted terms in the a hierarchical structure. 410 is an example of part of the text content taken from a Wikipedia article about biology. 420 is a selectable user interface object provided by the present invention with an exemplar label of "extract important terms and display in a topic tree". Once the user selects such an action, a topic tree 430 is displayed to the user, in which topics and subtopics and link to the text segments are displayed.

Figure 5:
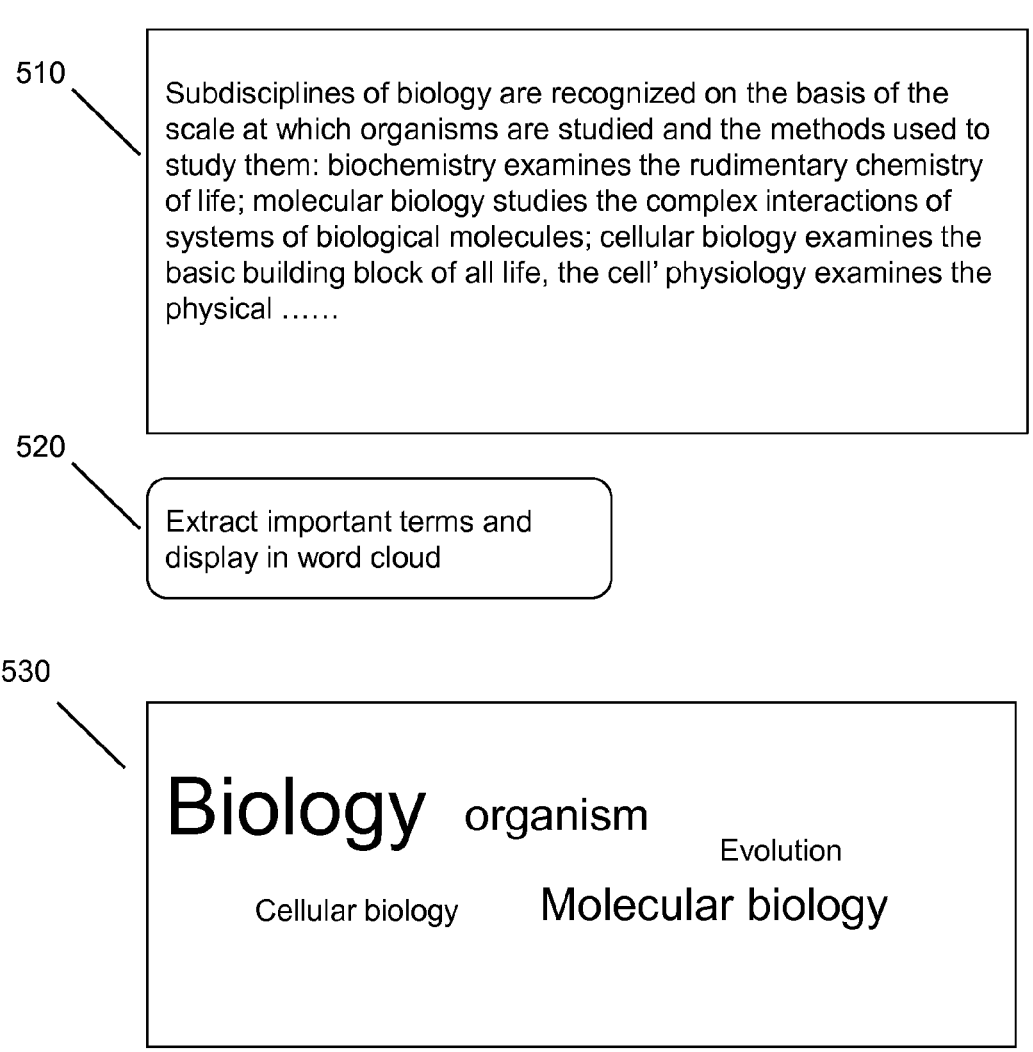
FIG. 5 is an illustration of a user interface that allows a user to display the extracted terms in a word cloud format in accordance with the present invention.

In some embodiments, in addition to the list format and topic-tree format, the important terms can be extracted and displayed in other formats as well. For example, user interface objects can be provided for users to select such actions as "extract important terms and display in a word-cloud format" or "display the topic 20 important terms in a word cloud format", etc., such as the example shown in FIG. 5.

The above examples are focused on the term importance as an attribute for selective term extraction. In addition to using the topical attribute of term importance as a criterion for extracting or displaying specific terms, in some embodiments, the criteria can be specific grammatical, semantic or contextual attribute or attributes.

The grammatical attributes of a term can include its grammatical roles such as whether the term is the subject of a sentence, or the predicate of a sentence, or part of the predicate of the sentence, or an object of a verb, or a predicative or a complement, etc. For example, in the sentence of "Digital cameras are convenient", the phrase "digital camera" is a subject, the phrase "are convenient" is a predicate, and the word "digital" or "camera" is a subcomponent of the phrase "digital camera", with "digital" being a modifier and "camera" being the head of the phrase.

Words also have the attribute of what is known as "parts of speech", for example, in above sentence, the word "digital" is an adjective, and the word "camera" is a noun.

In addition to the grammatical attributes, words or phrases carry meanings Some words refer to things or concepts, such as the names of various things in the world, and some words refer to an attribute of things, such as whether a person is "tall" or is "a student", and some words can carry an opinion, such as whether something is "good" or "bad". The word "good" usually carries a positive opinion, which is also one of the meanings that can be carried by the word "good". The word "bad" carries a negative opinion, among its other possible meanings. Meanings of a word or a phrase can also be named as "connotation" or "semantic attributes". For example, the basic meaning of the word "aspirin" is a drug, or the name of a drug. It can have other semantic or conceptual attributes such as being a pain-reliever, or an over-the-count drug, etc.

There are different types of semantic attributes, and each type can have a value. For example, "opinion" can be a semantic attribute type, and "positive" or "negative" can be a value of the semantic attribute of "opinion". "Drug" can be a type of semantic attribute, and "aspirin" can be a value of this attribute.

Terms in a text content can also have contextual attributes, such as whether a term is the subject or object of a particular verb, or whether the term is a modifier of a specific noun, or whether a term is before or after or near a specific word, etc.

Context can also change the inherent meaning of a word or phrase. For example, when the word "enough" is used alone, it means "plenty of", but when it is used with certain other words, such as in "barely enough", the entire phrase can mean "not enough".

The grammatical, semantic, or contextual attributes of terms in a text content can be identified by the linguistic processing module, or in some embodiments, by dictionary lookup. Once an attribute is identified, it can be made available for selective actions such as extracting, displaying, or highlighting, etc., to achieve more effective information management results, as described above with topic term extraction and display.

Selectively Extracting Terms Based on Semantic Attributes

For ease of illustration, in the following description, the word "term" or "terms" is often used in place of "words or phrases", while the two may be interchangeable. A term can contain one or more words or phrases, and in some cases, it can also mean one or more sentences. In general, a term in a text content can occur more than once, with each occurrence being a token instance of the term.

In one embodiment, the text data are user reviews on products or services.

A typical characteristic of such contents is that users express opinions on certain aspects of the products or services. For example, a user review on a hotel may contain expressions such as "The room was extremely clean, but the bed was too soft for my taste", or "The bathroom was spacious", or "Their food was not so good, and the front desk did not respond to our request promptly." Opinions can usually be categorized as being positive or negative, or neutral. The following description mainly uses examples based on the semantic attribute of "opinion" on products or services for ease of illustration.

As is mentioned above about the problem of information overload, in certain types of products or services, such as hotels and restaurants, there can be hundreds or thousands of reviews for an individual product or service on certain websites. If a reader wants to find information relating to a specific aspect of the product or service, such as the room service of a hotel or a special dish served by a restaurant, the user may need to dig in the hundreds or thousands of the reviews or perform a keyword-based search for such aspects of the product/service, provided that the search function is available and the results are manageable.

When the amount of user review data is too large, an effective way for readers to obtain key information quickly is for a computer system to first identify the words or phrases that carry opinions on certain aspects of the product or service, and then provide user interface objects for readers to either extract, display, or highlight the words or phrases that carry the specific information the reader is most interested in, such as the words or phrases that carry positive or negative opinions of the room, or bed, etc., of a hotel, or the food, service, price, etc., of a restaurant, or hide or un-highlight the part that is not of major interest.

Figure 6:
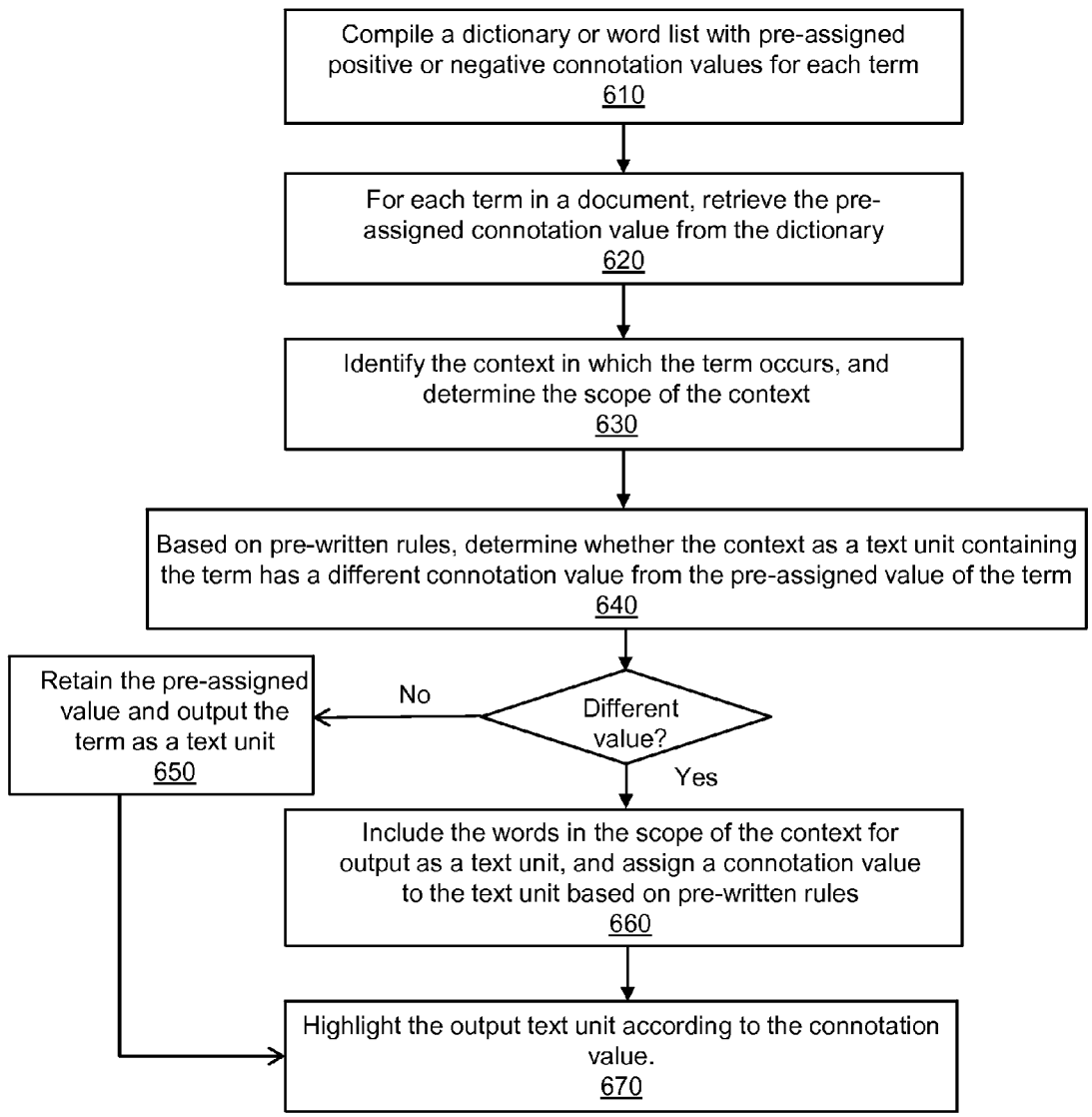
FIG. 6 is a flowchart detailing steps of associating attribute values to terms in a text content and determining the context of terms in a text content, in accordance with the present invention.

In some embodiments, an opinion-specific dictionary is used. FIG. 6 is an illustrative diagram for identifying the terms that indicate an opinion as their semantic attribute. In step 610, a dictionary or word list is first compiled to store the pre-assigned attribute type/value for each term to indicate whether the term carries a positive, negative, or neutral opinion. For example, in English, the word "good" can exemplarily be put in a positive word list, or be assigned a value of 1 to indicate that it inherently represents a positive opinion, and the word "bad" can exemplarily be put in a negative word list, or be assigned a value of −1 to indicate that it inherently represents a negative opinion, and the word "many" can exemplarily be put in a neutral word list, or be assigned a value of 0 to indicate that it inherently represents a neutral or no opinion. The list can be compiled manually by a human editor, or automatically by a computer program using some type of machine-learning methods, or both. If a single list is used for both opinion values, the value can exemplarily be between +1 and −1, to indicate the positive or negative semantic attribute, respectively, or +5 and −5 for a finer distinction. Once the dictionary is compiled, each term in the document is matched against the dictionary. If a term has a match, its pre-assigned semantic attribute type/value is retrieved from the dictionary in step 620. If a term is not found in the dictionary, it can be assigned a default value of zero for being neutral.

Again, the detailed method of compiling this list is not the focus of the present disclosure.

Once the semantic attribute of opinion is identified for each term, a user interface object is provided for users to selectively extract terms carrying either positive or negative or neutral opinion.

Figure 7:
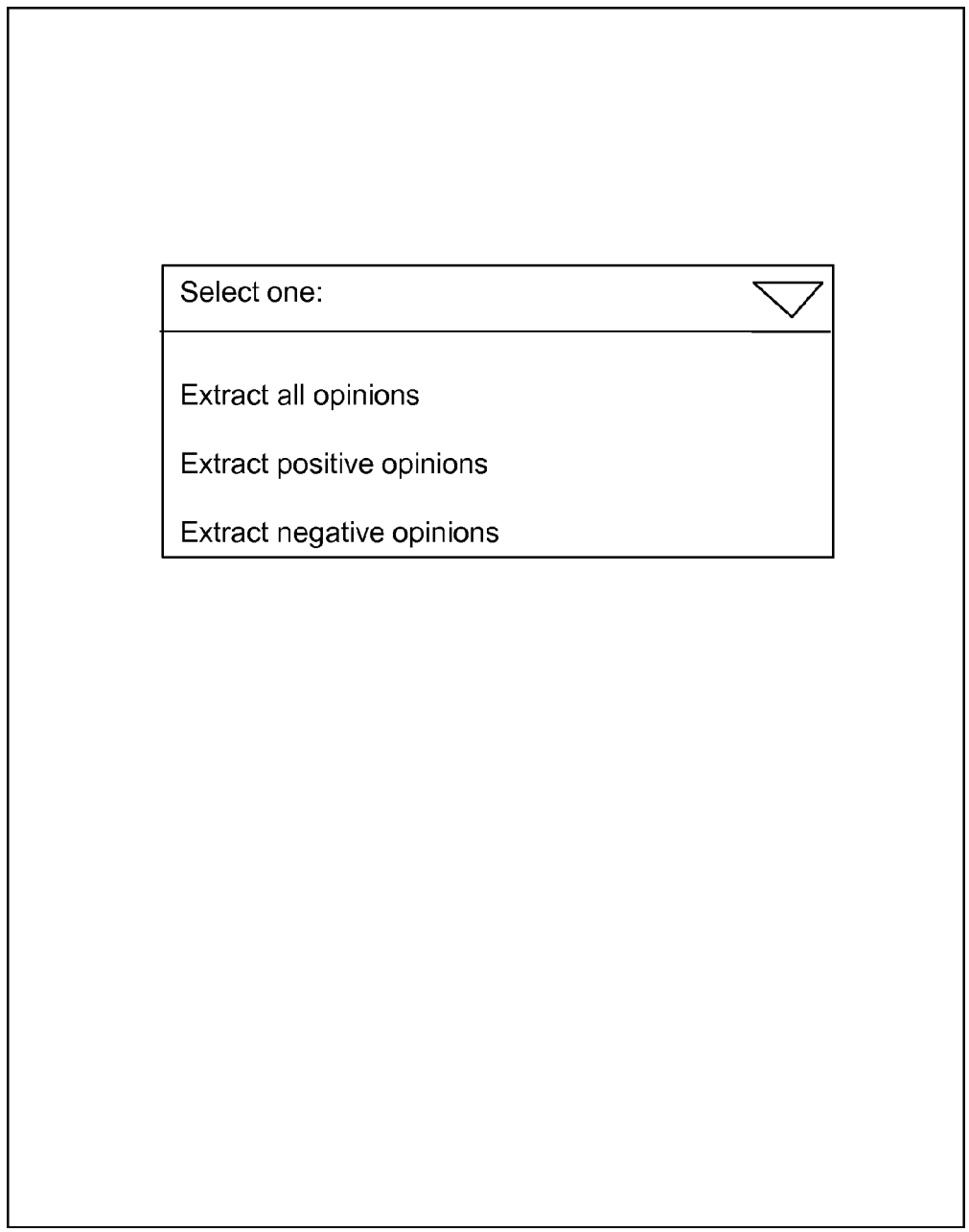
FIG. 7 is an example of a user interface object that allows a user to selectively extract terms that have a specific semantic attribute of "opinion" in accordance with the present invention.

FIG. 7 is an example of a user interface object that allows the user to selectively extract terms that carry a specific opinion. Interface options such as "extract positive opinion", or "extract negative opinion", etc., are provided. In FIG. 7, the user interface object is a dropdown menu with options. User interface object can also be a set of radio buttons, a slider, or any sort of object that allows a user to selectively indicate an option.

The terms so extracted can be used in many ways.

One way is to use such terms to create a report, such that, the management of the business being reviewed can quickly have an idea about what is being said about their products or services, without spending much time reading all the user reviews that are often in a unmanageable quantity. For companies that receive a large number of customer feedbacks on their products or service, or questions received by technical support, the management of the company may want to know what or how many negative comments are there in the user feedback, or what type of problems that are reported most often. Hiring a large human labor force to manually process the data can be costly, but with the present invention, the system can automatically gather all the related information, and extract such information from a large number of text data, and then be used in a report for easy digestion or further analysis.

In some other embodiments, terms having specific attributes can be used to further build a topic tree such as the example shown in FIG. 8 for more convenient information management.

For example, for a hotel review, words or phrases meeting the criterion of having a high term importance score can first be extracted as described above with extraction based on topical attributes. When a large amount of data is processed as a whole, commonly used terms will likely receive a high importance score assigned by a linguistic processor. Based on the experiment data by the present inventor, for a number of exemplar hotel review articles, terms such as "room", "bathroom", "bed", "price", etc., are often the topics that can be identified and extracted. Then, on top of these topic terms, segments of user comments meeting the criterion of carrying an opinion and related to the extracted topics can further be identified and extracted for each of the common topics.

FIG. 8 is an example of such a topic tree with the second-level nodes being the extracted terms that carry an opinion about the first-level nodes as major topics.

In FIG. 8, there are two levels of nodes in the tree structure. The first-level nodes such as 810, 820, 830 are major aspects of a hotel, or topics of a hotel review, that can be extracted based on the topical attributes or term importance as described above, or can be pre-defined. For each first-level node as a topic, second-level nodes can be created by extracting the comments related to the first-level topics, such as shown by 815. Also as described above, the detailed steps of associating the comments with the topics are disclosed in the above-mentioned referenced disclosures. When extracting the comments, in addition to the semantic attribute of "opinion", grammatical attributes such as being part of the predicate, or being a predicative of a subject represented by the corresponding topic term can also be used for the extraction of such terms. In FIG. 8, it is shown that under the topic of "Room" (810), some comments are positive, such as "fantastic", and some are negative, such as "not so great", and most of them are in the predicate that is associated with topic terms as the subject. The comments can be linked to the original text in the content, such as shown by 825.

The advantage of such a topic tree based on the extracted terms that meet user-specified semantic or grammatical criteria can provide an easy way to gather the key information that can otherwise be buried in a large amount of data.

In some embodiments, whether the terms are extracted based on the term importance, or on the semantic or other attributes, the extracted terms can be stored in a data file, and later be retrieved for display. The present invention also provides user interface objects for users to selectively display such extracted terms in a specific view format, such as a list format, or tree format, or a word-cloud format. For example, selectable user interface objects with labels such as "display the top 30 important terms in a word cloud format", or "display the terms carrying positive or negative opinions in a tree format", etc.

Selectively Displaying or Hiding Terms Based on Semantic Attributes or Term Importance As can be seen from the example illustrated in FIG. 8, user comments can carry opinions. Some are positive, such as "fantastic", while others can be negative, such as "not so great". When the list of comments is too long, or the number of second-level nodes is too large, users can still have the problem in quickly finding a particular comment, or in finding a pattern of the comments as to how good or bad the room is.

In some embodiments, the present invention further provides a method for selectively displaying or hiding terms that carry a particular semantic attribute value, such as whether a term is expressing a positive opinion, or a negative opinion, or a neutral opinion, or whether a term is an important term in the text content.

As described above, terms of a particular semantic attribute such as a particular opinion or terms above an importance threshold can be extracted from the text content, but not all of the extracted terms need to be displayed in the user interface, depending on the user needs. For example, in some cases, a user may be particularly interested in reading the positive comments, or negative comments, or there are too many extracted terms to be displayed. In such a case, the to present invention provides another effective method for selectively showing or hiding terms based on specific attribute values.

For example, in the case of the topic tree exemplified in FIG. 8, a user interface object can be provided for the user to selectively display only the positive comments, or only the negative comments, or both. FIGS. 9A and 9B illustrate an example of such selective displaying. In FIGS. 9A and 9B, a set of user interface objects 910 is displayed and the user can select either "show positive comments only", or "show negative comments only", or "show all comments". In FIG. 9A, only the positive comments on the second-level nodes of FIG. 8 are displayed according to the user selection. In FIG. 9B, only the negative comments on the second-level nodes are displayed according to the user selection. The set of user interface objects 910 in either FIG. 9A or FIG. 9B can be a dropdown menu, clickable buttons, radio buttons, or any sort of interface objects that allow a user to specify an option.

One advantage of this selective showing/hiding of terms based on semantic attributes is that users can not only quickly find the information that is of most interest, but also find a pattern of the comments that share the same semantic attributes, such as what all positive comments are about, and what all negative comments are about. This is also particularly valuable for the management of the business to act on the user feedback to improve their business. Without the selective displaying or hiding, it can be very difficult to locate or gather the comments of similar nature dispersed in various parts of a large number of review articles, and to see a pattern from the comments.

In some embodiments, when the extracted terms are in a tree format, with the first-level nodes showing the major topics and the second-level nodes show comments on the corresponding topics, all the second-level nodes can be hidden by default when displayed to the user, such that, only the topic terms as the first-level nodes are displayed at first. User interface objects are provided for the user to select a topic as an action of selectively displaying the second-level modes, which, in this example, are comments on the selected topic. FIGS. 10A and 10B are illustration of the display format. In FIG. 10A, only the topics of a hotel review as the first-level tree nodes are first displayed in a list format, with their related comments hidden. Users can select a topic in the list, and the related comments can be displayed as shown in FIG. 10B. A user interface object can be provided such as one with a label of "select a topic to see comments", or "view comments by topics", etc. This selective display method can use the terms that are previously extracted using a semantic or other attributes as a criterion, and stored in a data file. It is functionally equivalent to "display comments for the selected topic", in which the action is "display", and the terms to be displayed have the semantic attribute of being the comments for the selected topic.

This is especially a useful feature for many product or service review sites to enhance user experiences, as well as other sites. Users can first take a look at what the major topics contained in the content are, and then selectively display the related comments or other information about a selected topic.

Selectively Highlighting Terms Based on Semantic Attributes or Term Importance

Figure 11:
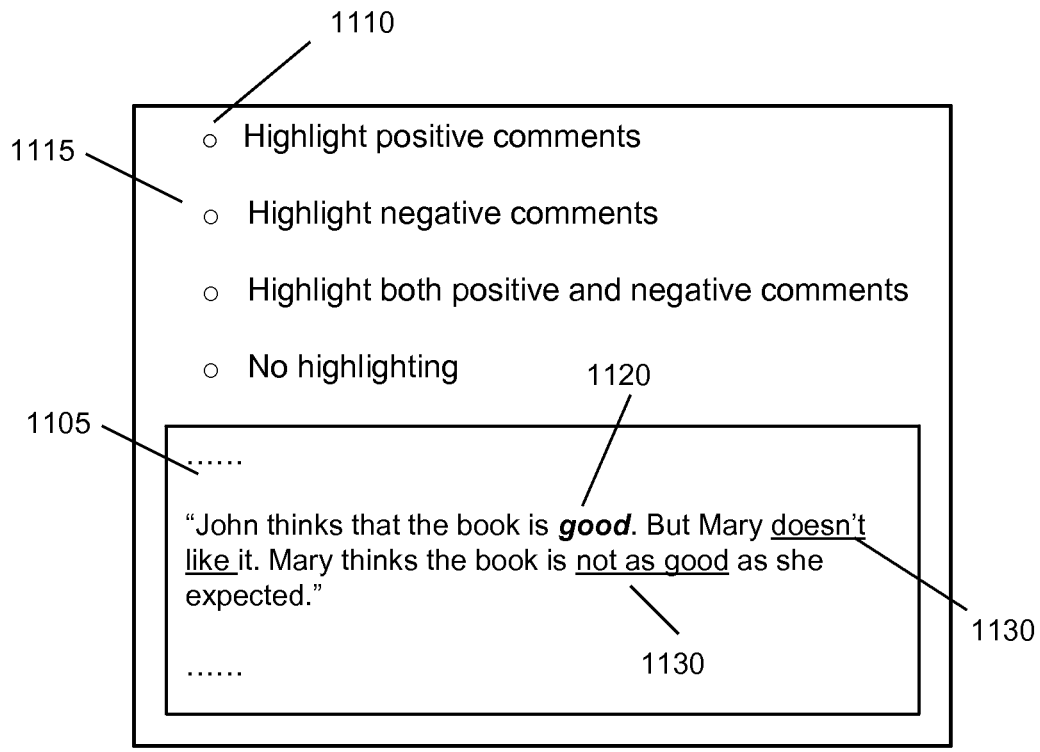
FIG. 11 is an illustration of a user interface that allows a user to selectively highlight terms of a specific attribute in a text content in accordance with the present invention.

Again, with the example of a topic tree, in some embodiments, when the number of identified or extracted terms is moderate, instead of selectively displaying or hiding terms with a particular semantic attribute, users can also selectively highlight or un-highlight such terms based on their semantic attribute, or attribute type or value. FIG. 11 is an illustration for selectively highlighting only the positive opinion in the exemplar hierarchical structure. An exemplar user interface object is provided that displays a description of the semantic attribute, such as the "positive opinion", and a desired action for the system to perform on terms that have the specified semantic attribute, such as the action of highlighting, or un-highlighting, etc. As is shown in FIG. 11, if button 1110 is selected, the term "good" (1120) can be highlighted in bold font, and if button 1115 is selected, the term "not as good" (1130), etc., can be highlighted by an underline. The bold font and underline are only examples for illustration purposes. Other methods such as different colors can also be used to achieve the visual effects of highlighting.

As is shown in FIG. 11, in addition to the exemplar hierarchical structure for illustration purposes, the system and method of the present invention can also be applied to regular formats of text contents. For example, when the system is displaying a document to the reader, a user interface object can be displayed to the reader at the same time. The user interface object can display a description of the semantic attributes of terms in the text content as a criterion for selective actions, such as extraction, displaying, or highlighting, and the reader can indicate to the system which action to perform on the terms that have the specified semantic attributes. For example, when the system is displaying a medical document to the reader, a user interface object displayed at the same time can let the reader select a pre-specified semantic attribute and an action type, such as "names of drugs that interact with other drugs", or "names of drugs that are FDA approved"; and also select an action for the system to perform on the terms in the content that meet the criterion, such as "extract", or "highlight" or "un-highlight", etc. Once the desired action is performed by the system, the reader can quickly focus on these terms that carry the information the reader may be most interested in.

Figure 12:
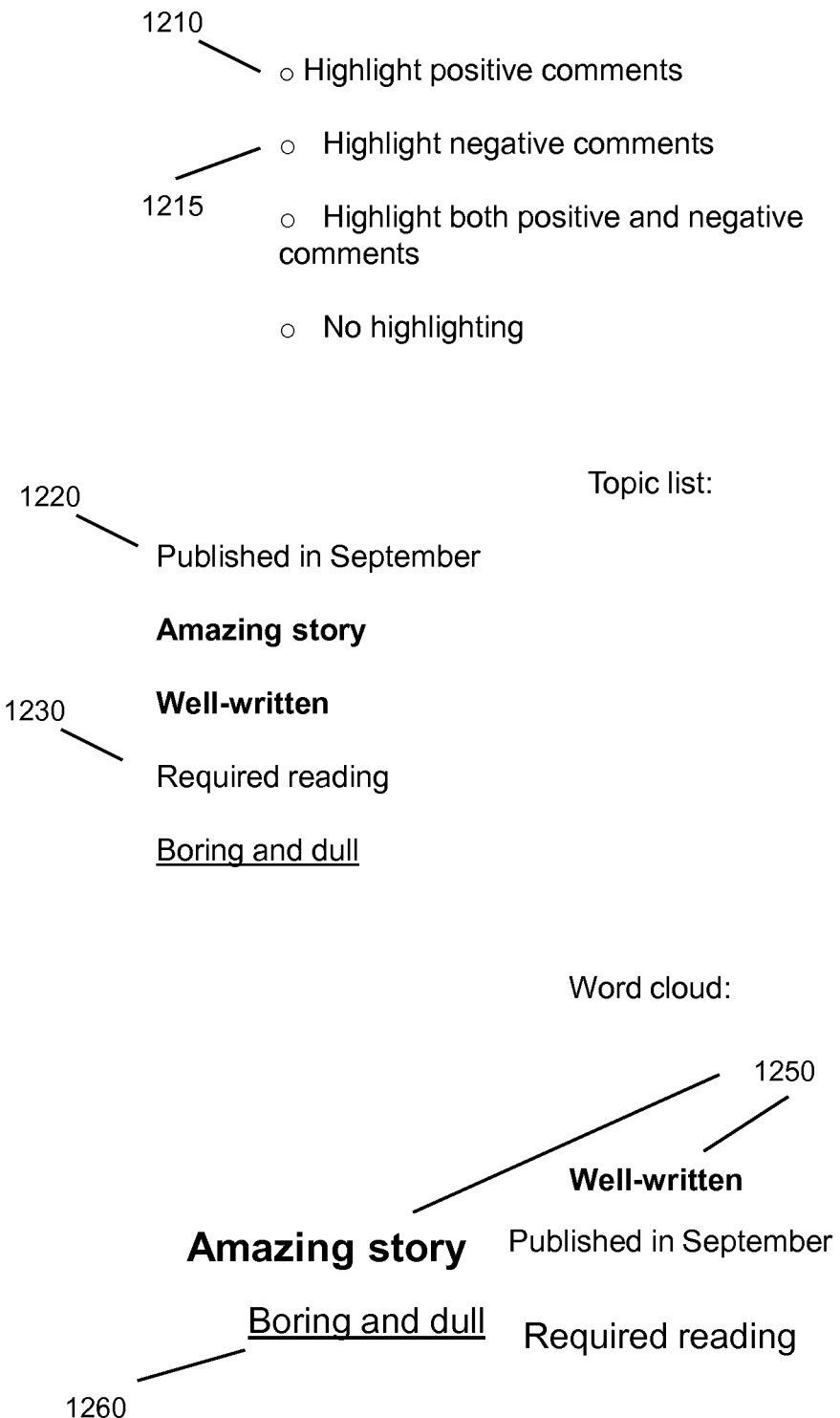
FIG. 12 is an illustration of a user interface that allows a user to selectively highlight terms of a specific attribute in a list format and a cloud format in accordance with the present invention.

In addition to the regular text content and the topic tree format as described above, the action of selectively displaying or highlighting can also be applied to other data display format, such as the list format and word-cloud format. For example, whether it is in a list or a cloud format, user interface object can be provided to selectively display or highlight terms that carry either a positive opinion, or a negative opinion, or a neutral opinion, or terms that meet an importance criterion. FIG. 12 shows examples of these applications. In FIG. 12, if button 1210 is selected, the term "amazing story" (1220), or (1250) can be highlighted in bold font, and if button 1215 is selected, the term "not as good" (1230), or (1260), etc., can be highlighted by an underline.

Selectively Extracting, Displaying, Highlighting Terms Based on Context

In some embodiments, the context of the terms in the text content can be analyzed, and the extraction, display or hiding, or highlighting of the terms can be based on the context, in addition to the individual terms.

In the present disclosure, one focus is on identifying the context that may change the inherent connotation of a term, and determine the scope of the context to be extracted, displayed, or highlighted to the reader. Going back to the example of opinions, when the word "good" is used alone, it usually indicates a positive opinion; and when it is used in a context of "very good", the entire phrase still represents a positive opinion. However, when it is used with another word such as "not", as in "not good", or "not very good", the contextualized phrase of "not good" or "not very good" represents a negative opinion. If only the word "good" is looked up from the dictionary without also identifying the context and a search for the word "good" is conducted in the document, the phrase "not very good" will still be treated as indicating a positive opinion, which would be incorrect.

Continuing with the illustration in FIG. 6 as described above, which is an illustrative diagram for a method of identifying the terms together with their context that carry different semantic attributes, initial attribute values are assigned from dictionary lookup in steps 610 and 620 before context information is checked. In addition to this, the present disclosure uses linguistic rules to identify the context (Step 630) and determine whether the context affects the pre-assigned value or not (Step 640). If the context does not change the pre-assigned attribute value, then the original pre-assigned value is retained and the term is output for extraction, display or highlighting (Step 650). If the context as a text unit indicates a different opinion from the pre-assigned value of the term, then the scope of the context is identified as a larger text unit containing the original term (Step 660), and words in the context scope are assembled into a string for output as a whole for extraction, display, or highlighting, and to correctly and accurately indicate the opinion of the contextualized text unit to the reader.

For another example, if the original text is "It is not good", the text unit of "not good" will be identified as indicating a negative opinion, and will be treated as the scope of this context, and will be output for highlighting as a unit; if the original text is "nothing there seems to be good", the entire sentence of "nothing there seems to be good" is treated as indicating a negative opinion, and also as the scope of this context, and will be output for action as a unit; if the original text is "I don't think it's good", either the entire sentence is treated as indicating a negative opinion and as the scope of this context, and will be output for highlighting as a unit, or part of the sentence such as "don't think it's good" is treated as the scope of this context, and will be output for action as a unit. This way, the output will not be the word "good" alone as indicating a positive opinion, but will correctly indicate that the contextualized text unit represents a negative opinion.

The above examples are based on negation of the original meaning or semantic attribute value. Negation is only one of the context types that can make an attribute value such as an opinion different from or opposite to the pre-assigned value of a term without the context. Other types of contexts can also have a similar effect. For example, when people usually think that "high quality" is good, and "low quality" is bad, the word "high" or "low" alone cannot always determine whether the resulting connotation is positive or negative. For example, people usually know that "high blood pressure" is not good, but "low blood pressure" is not a good thing, either; and what is good for blood pressure is "normal blood pressure". Thus, different rules must be used to handle different cases. The methods disclosed in the present invention can use such rules to identify the resulting attribute value for different context types, and identify the corresponding scope of context for extraction, display or highlighting (Step 670).

As is shown in FIG. 11, the person John gives a positive opinion on the book as being "good", and the term "good" is highlighted in bold and italic font style (1120). On the other hand, Mary has a different opinion on the same book. In this case, even though the word "like" has a pre-assigned positive attribute value, the context of the term "like" is identified, and is determined that the context of "doesn't like" as a text unit has a negative attribute value, opposite to the pre-assigned positive value for the term "like". Using a pre-written linguistic rule, the scope of the context is identified to be "doesn't like" as a text unit, and the entire text unit of "doesn't like" is highlighted by an underlined font style (730), different from the positive word of "good". Furthermore, in the third sentence of "Mary thinks the book is not as good as she expected", even though the word "good" has a pre-assigned positive attribute value, the present invention identifies the context of the word "good" to be a negation context, and the scope of the context is determined to be "not as good" and is treated as a single text unit or a single term. In the output, the text unit of "not as good" is highlighted also with an underlined font style to distinguish it from the positive instance of "good" in the same document (1130).

While the exemplar buttons in FIG. 11 only show the action of highlighting, the scope of the context is also available for other actions of extracting, showing or hiding, etc. As is described above, in the case of a topic tree structure with different levels of nodes, the node terms can be either displayed or highlighted according to their semantic and grammatical context, or the scope of such context.

It should be noted that in modern-day user interface, certain information in the content can be easily highlighted either by default, or by pre-configuration as user preference, or by a process such as highlighting certain specified keywords, or highlighting keywords that match a search query in a search result page, or some other criteria. However, users are not able to dynamically and selectively extract, display or hide, or highlight part of the contents that contain specific information, especially such information that does not directly match a keyword in the content, such as a stretch of text that indicate a positive or negative opinion, or other type of grammatical or semantic attributes or properties of an object represented by a term. For example, certain web pages automatically highlight addresses or phone numbers or names of places contained in a page or email, but users do not have real-time control to select which information to extract, display or hide, or highlight or un-highlight, and the statically highlightable information is limited to predefined items such as address or phone numbers, etc., based on string pattern matching, rather than the semantic attribute match for the linguistically meaningful units such as positive or negative opinions and their contexts, or based on domain-specific topics. One of the novelties of the present invention is to first identify the semantic attributes of terms as well as their context scope in the document, and then providing user interface control objects for users to dynamically and selectively extract, display or hide, or highlight or un-highlight terms and their contexts that carry specific information to serve their specific needs.

As is described above, in addition to topical and semantic attributes, other types of attributes can also be used for such selective actions, such as the grammatical attributes, or contextual attributes. For example, a user interface object can let the user select "highlight or extract the subject terms with the word "follow" as its verb", or "highlight or extract the object terms with the word "take" as its verb", or "highlight or extract the object terms with the word "student" as its subject", etc., and perform the corresponding action to display the text content in a way that meets the specific need of the user.

The above disclosed method of identifying and assigning attribute type or value of a term in a text content or a node name in a category tree, or in a list or cloud format, and providing user interface objects for users to decide whether or how to display or highlight terms or text units of a specific connotation or attribute type or value is not limited to the specific document type of product/service review as exemplified above. The method can be generally applied to other types of documents and other types of attributes as well, such as briefly exemplified above with medical documents.

User Interface Objects for Specifying the Attributes and Action

An important part of the present invention is the user interface object and its function in displaying a pre-defined attribute as a criterion for extracting, displaying or hiding, or highlighting terms that meet the criterion, without user typing in the criterion, or without the need to match a keyword in the criterion with a keyword in the content, as well as its function of receiving user input for a selected action to perform on the terms in the text content that carry the specified attributes. For example, as described above, when reading medical documents, a user interface object can be provided to allow the user to select such actions as "highlight and extract drug names that have an interaction with other drugs", or "highlight and extract drug names that can reduce arthritis symptoms", etc. and in addition to highlighting or un-highlighting and extracting, user can also display the terms in a user interface in a way that the user can copy/paste or record for use elsewhere, such as assembling them to create a report.

In addition to providing a user interface object for displaying a specified attribute as an action criterion, in some embodiments, the system can allow the user to enter a criterion using natural language, and then the system can interpret the intended criterion, and perform a similar operation.

The above are only examples of the methods and applications. The presently disclosed system and methods and user interface can also be applied to many other environments without deviating from the spirit of the principles and the methods described above.

The following description constitutes the main body of the present disclosure as a Continuation-in-Part application of the parent application retained and referenced above.

Contextually Determining the Connotation or Sentiment Type of Text Units

In a general embodiment, grammatical analysis is first performed to identify the grammatical attributes and relationships between the words or phrases in a user expression or in a text content in general. And semantic attributes such as the inherent or default connotations or sentiment type of the words or phrase are obtained, and the connotations or sentiment type of the expression as a whole is then identified based on the grammatical or semantic attributes of the words or phrase in the expression, and their relationships.

Figure 13:
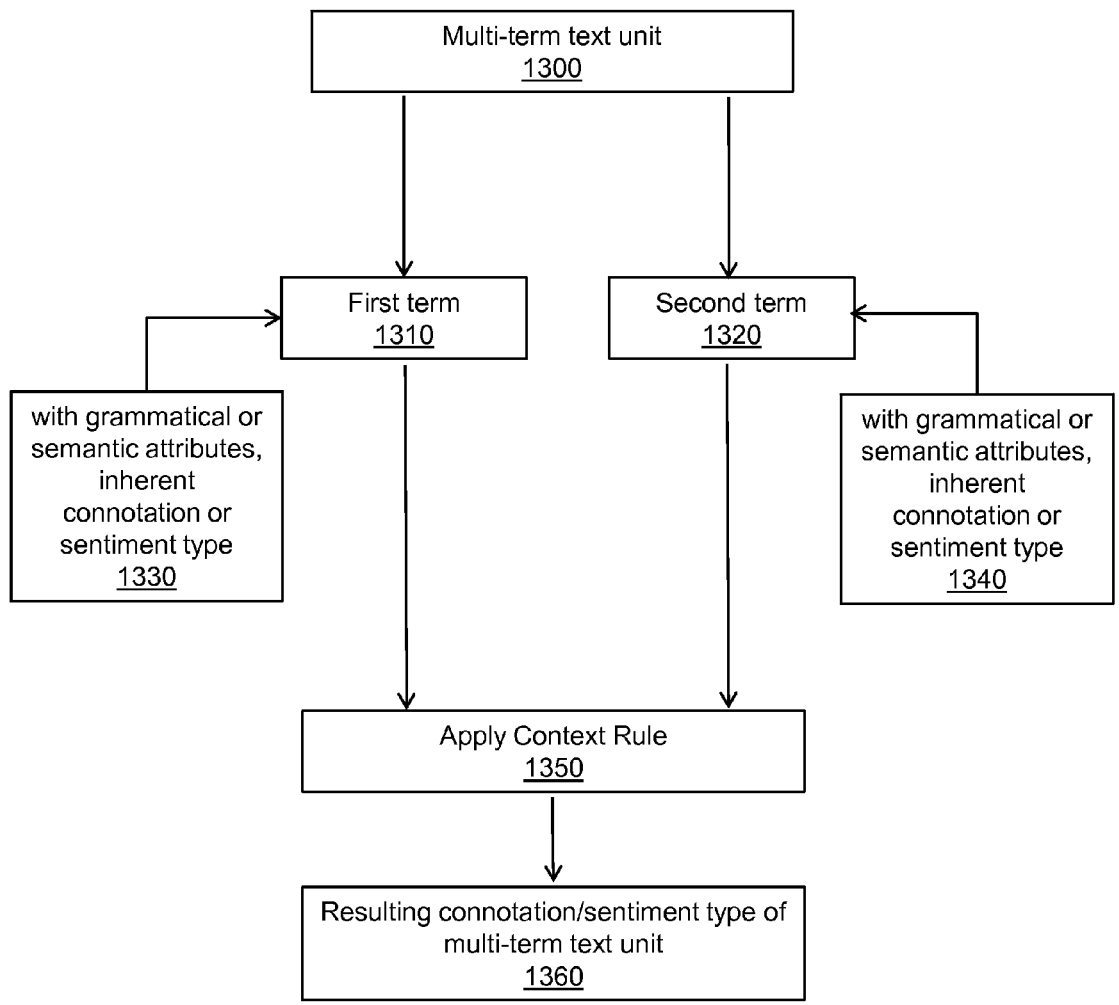
FIG. 13 illustrates a general overview of one embodiment of the present invention.

FIG. 13 illustrates a general overview of one embodiment of the present invention. A multi-term text unit 1300 containing two or more terms is first obtained. A term in a text unit can be a word, or a phrase containing more than one word, and in some cases, it can also be a sentence. Text unit 1300 can be extracted from various sources, including web pages, documents on a computer, advertisements, email, status updates and messages on a social networking site, user reviews on products or services, etc. After a multi-term text unit is obtained, the present invention extracts a first term 1310 and a second term 1320. Grammatical and semantic attributes associated with the terms are identified. Such information can usually be obtained from dictionary lookup, or from syntactic or semantic analysis. Such information or attributes include whether a term is a verb or a noun, or a subject or an object, etc., and whether the term carries an inherent positive or negative or neutral connotation or sentiment type, etc., as is shown in 1330 and 1340. Then, a context rule 1350 is applied based on the grammatical or semantic attributes, and a resulting connotation or sentiment type 1360 for the multi-term text unit is produced by the rule, and can be output for display or further analysis or reports.

In one embodiment, a text unit comprising at least two terms are identified as the unit for analysis.

Then, grammatical attributes such as the grammatical roles of whether a term is a subject of a sentence, or an object of the sentence or a verb, and whether a term is a modifier of another term in a phrase, or a term as a head of a phrase being modified by other term, etc., are identified. Parts of speech associated with each term are also identified. Parts of speech include whether a term is a noun, or a verb, or an adjective, an adverb, a preposition, or conjunction, auxiliary, determiner or article, etc.

Some conventional approaches use the grammatical negation element or negator in a language as a piece of context information to change the contextualized connotation or opinion value of an expression, such as negating the positive connotation of the word "good" in "it is not good", which changes the connotation of the sentence to a negative connotation. However, there are much more linguistic elements in a language that are not necessarily grammatical negators like the word "no" or "not" in the English language, or the "ne", "pas" in French, or "bu" in Chinese. The non-grammatical negator words are common words in a language, such as the word "prevent", "high", "low" in English as described above. Conventional approaches usually cannot address the context of such types that do not involve the grammatical negators. For example, the word "break" is commonly perceived to be associated with a negative connotation, and the word "barrier" can also be commonly perceived to be associated with a negative connotation, but none of the two words are grammatical negators like "no" or "not". A simple dictionary lookup method in the conventional approach may assign a negative connotation to the text unit of "break a barrier" as being negative based on the inherent negative connotation of the individual words in the text unit, thus producing an incorrect result. However, in the present invention, methods are provided for effectively solving such problems and producing correct results.

In the present invention, methods are provided for text units of various types of linguistic structures. In some embodiments, the present invention provides methods for determining the connotation of a text unit comprising at least two terms with one of them being a noun or noun phrase and one of them being a verb or verb phrase. The noun term can be a subject or an object of the verb. For example, in the text unit "bought a book", the verb is "bought" and the noun "book" or the noun phrase "a book" is the object of the verb. In another text unit, such as "the student bought a book", the noun term "student" is the subject of the verb "bought". As is noted above, in the present disclosure, the term "noun" or "noun phrase" is used interchangeably, and the same is also true for verb or a verb phrase, and other types of words or phrases. In some cases, the word "noun term" or "verb term" is also used to refer to either a noun as a single word, or a multi-word noun phrase, and the same also applied to verb or other parts of speech.

Figure 14:
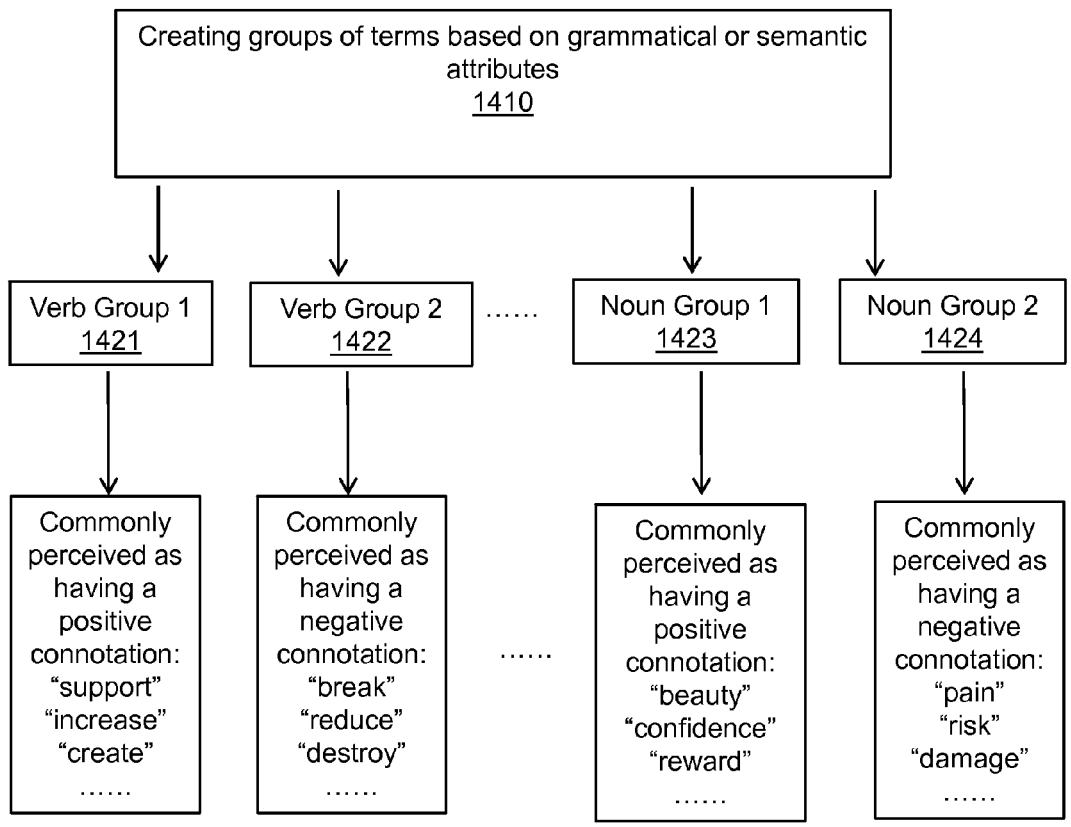
FIG. 14 illustrates one embodiment of the present invention in which terms in the English language are grouped based on grammatical or semantic attributes.

FIG. 14 illustrates one embodiment of the present invention in which terms in the English language are grouped based on grammatical or semantic attributes. Groups 1421 and 1422 are groups of terms that have the grammatical attribute of being a verb. Group 1421 contains verbs that have a positive connotation by default, and Group 1422 contains verbs that have a negative connotation by default. Similarly, Groups 1423 and 1424 are groups of terms that have the grammatical attribute of being a noun. Group 1423 contains nouns that are commonly perceived to have a positive connotation, and Group 1424 contains nouns that are commonly perceived to have a negative connotation. The present invention is not limited to these groupings, and the importance of these groupings will be explained further in the present disclosure.

A Verb with an Object Noun

In one embodiment, the present invention provides methods for determining the connotation of a text unit that comprises a verb and an object. For example, the phrase "prevent disease" is such a text unit. Similar units comprising a verb and an object can include examples like "solved a problem", "increased benefit", "reduced risks", "resolved disputes", "gained much weight", "improved symptoms of a cold", "lost confidence", etc. For expressions like those, it can be very challenging for conventional approaches to produce an accurate result in determining the connotation of the expression based on the dictionary lookup method of retrieving the default connotation of the individual words. For example, the default connotation of the verb words "prevent", "solve", "resolve", "improve", "increased", "gained", etc., can be positive in most of the dictionaries or based on common sense; and the verb "reduced", "lost" can have a negative connotation by default; and the connotations of noun words such as "problem", "disputes", "symptoms of a cold", etc., can be negative in most of the dictionaries or based on common sense. However, as can be seen from these examples, the connotation of the entire expression as a text unit does not necessarily have the same connotation as its component words. Rather, the connotation of the entire expression is dependent on the context in which the individual words occur. This context includes whether the connotation of the verb is positive or negative, and whether the connotation of the object noun is positive or negative, and what specific words are the verbs or the nouns.

The present invention provides methods for accurately determining the connotations of such expressions based on contextual analysis. In the present invention, a set of general rules (behavior patterns of verbs or noun) are defined in terms of possible ways certain verbs or nouns may contextually change the connotation of the text unit.

In one embodiment of the present invention, for a text unit containing two terms, with the first term being a verb and the second term being the object of the verb, a rule can be defined as:

Assign a negative connotation to the text unit if the verb is associated with a positive connotation and the noun is associated with a negative connotation, or assign a positive connotation to the text unit if the verb is associated with a positive connotation and the noun is also associated with a positive connotation.

This rule can be written in a more general form involving a first term and second term of a multi-term text unit to take into account different grammatical forms of text units other than verb+object structures:

Rule 1:

Assign a negative connotation to the text unit if the first term is associated with a positive connotation and the second term is associated with a negative connotation, or assign a positive connotation to the text unit if the first term is associated with a positive connotation and the second term is also associated with a positive connotation.

Rule 1 is an example of a context rule 1350 in FIG. 13. Examples of English phrases where this rule is applicable can include "create problem", "raise alarm", and "increase risk" on one hand as having negative connotations, and phrases such as "create value", "provide support", and "increase benefit" on the other as having positive connotations.

Not all verbs in a language may follow this rule. In the present invention, a subset of verbs in a language can be identified that follow this rule. For example, in English, verbs such as "create", "provide", "increase", etc., generally exhibit such behavior, and can be assembled into a group, such that, at processing time, a verb can be checked for its group membership. This type of group can be an example of Group 1421 as illustrated in FIG. 14. If a verb is a member of this group, then Rule 1 can be applied to determine the connotation of the text unit, together with the default connotation of the object noun. Such verbs can be identified either empirically by performing testing on individual verbs, or be identified by certain semantic attributes that are common to such verbs, as will be described later, or by certain statistical learning methods based on training data.

Figure 15:
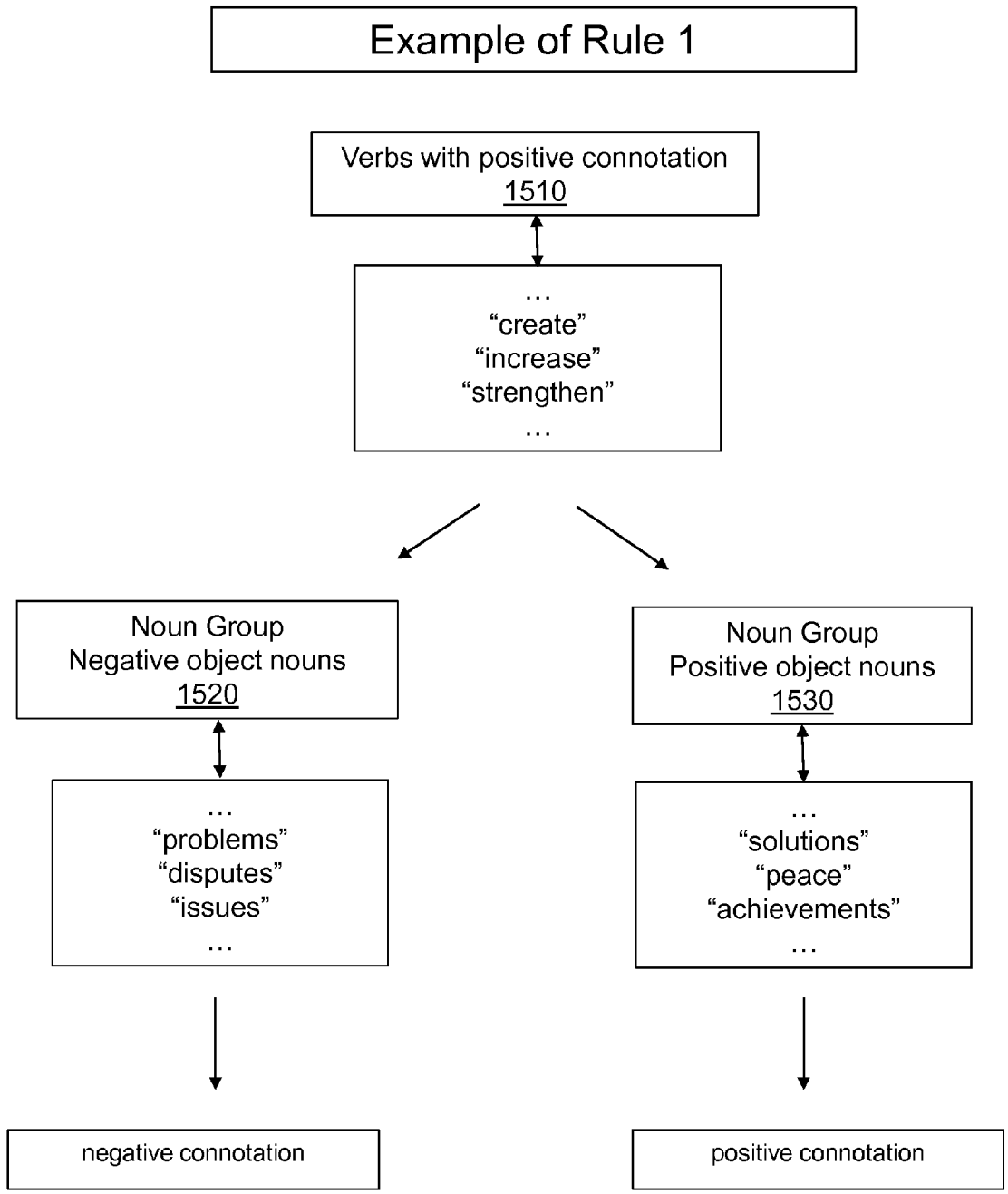
FIG. 15 illustrates one embodiment of Rule 1 in the present invention.

FIG. 15 illustrates one embodiment of Rule 1 in the present invention. Group 1510 comprises of verbs that have a positive connotation, Group 1520 comprises of object-nouns that have a negative connotation, and Group 1530 comprises of object-nouns that have a positive connotation. A text unit comprising a verb from Group 1510 and an object from Group 1520 can be determined to have a negative connotation under Rule 1. A text unit comprising a verb from Group 1510 and an object from Group 1530 can be determined to have a positive connotation under Rule 1.

In some embodiments, a second rule can be defined as:

Assign a negative connotation to the text unit if the verb is associated with a negative connotation and the noun is associated with a positive connotation, or assign a positive connotation to the text unit if the verb is associated with a negative connotation and the noun is also associated with a negative connotation.

Writing this rule in its more general form:

Rule 2:

Assign a negative connotation to the text unit if the first term is associated with a negative connotation and the second term is associated with a positive connotation, or assign a positive connotation to the text unit if the first term is associated with a negative connotation and the second term is also associated with a negative connotation.

In the above case, the verb is the first term and the object is the second term in the general rule. Examples of phrases where this rule is applicable can include "destroy value", "reduce support", and "decrease benefit" on one hand as having negative connotations, and phrases such as "reduce risk", "destroy enemies", and "break barriers" on the other as having positive connotations. Similarly, another subset of verbs in a language can be identified that follow this rule. For example, in English, verbs such as "destroy", "reduce", "decrease", etc., generally exhibit such behavior, and can be assembled into a second group, such that, at processing time, a verb can be checked for its group membership. If it is a member of this group, then, Rule 2 can be applied to determine the connotation of the text unit, together with the default connotation of the object noun. Similar to Rule 1, such verbs can be identified either empirically by performing testing on individual verbs, or be identified by certain semantic attributes that are common to such verbs, as will be described later, or by certain statistical learning methods based on training data. In the following examples of other rules, such grouping methods generally apply to all rules, and will be omitted from description.

Figure 16:
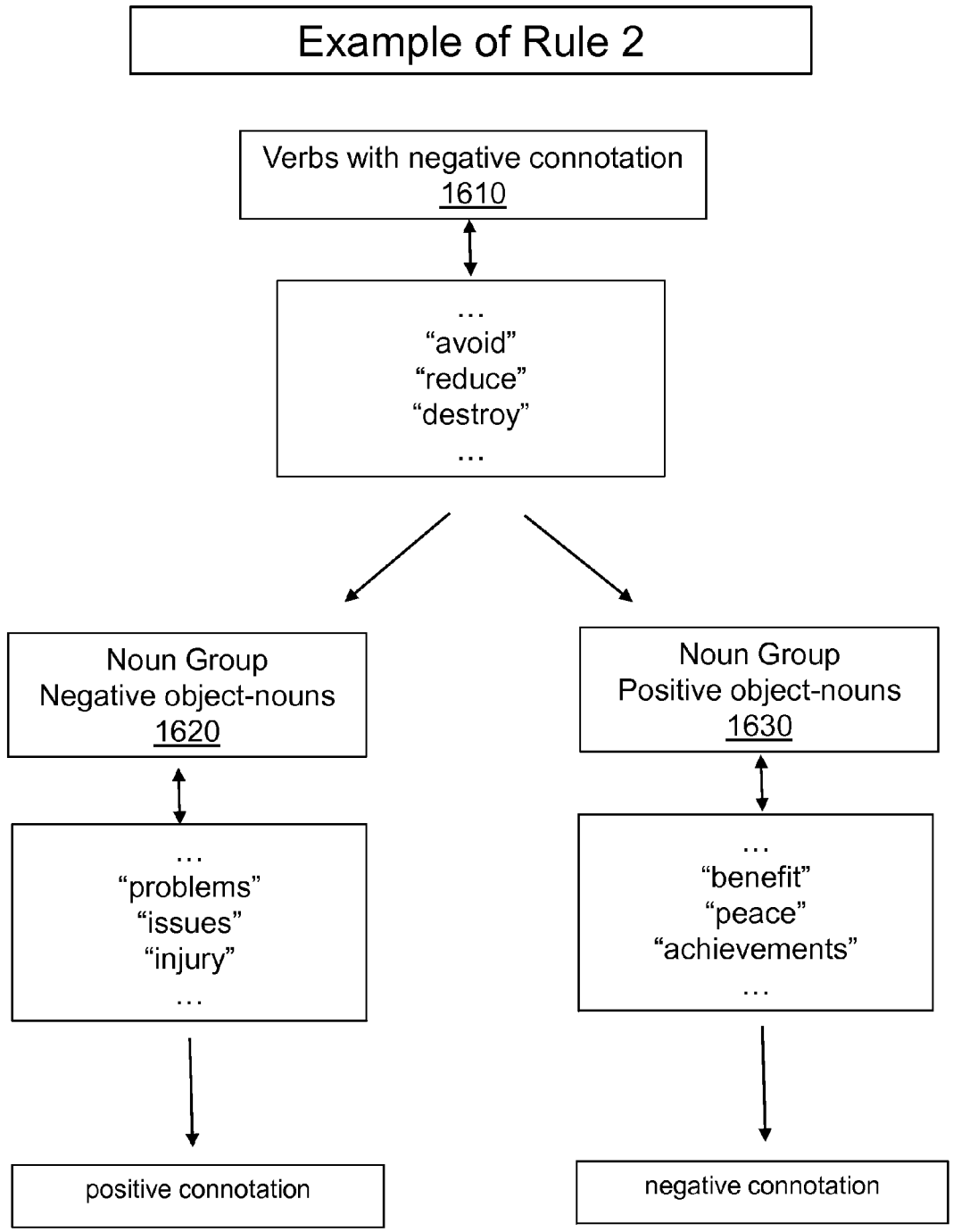
FIG. 16 illustrates one embodiment of Rule 2 in the present invention.

FIG. 16 illustrates one embodiment of Rule 2 in the present invention. Group 1610 comprises of verbs that have a negative connotation, Group 1620 comprises of object-nouns that have a negative connotation, and Group 1630 consists of object-nouns that have a positive connotation. A text unit comprising a verb from Group 1610 and an object from Group 1620 can be determined to have a positive connotation under Rule 2. A text unit comprising a verb from Group 1610 and an object from Group 1630 can be determined to have a negative connotation under Rule 2.

In some embodiments, a third rule can be defined as:

Assign a positive connotation to the text unit if the verb is associated with a positive connotation and the noun is associated with a negative connotation, or assign a negative connotation to the text unit if the verb is associated with a positive connotation and the noun is also associated with a positive connotation.

Writing this rule in a more general form:

Rule 3:

Assign a positive connotation to the text unit if the first term is associated with a positive connotation and the second term is associated with a negative connotation, or assign a negative connotation to the text unit if the first term is associated with a positive connotation and the second term is also associated with a positive connotation.

Examples of phrases where this rule is applicable can include "solved problem", "repaired damage", and "prevented disease" on one hand as having positive connotations, and phrases such as "prevented work progress", and "mitigated support" on the other as having negative connotations. As illustrated above, the verb "prevent" is commonly perceived to have a positive connotation, such as the name of a magazine known as "Prevention", or in an expression like "prevent disease". However, even though Rule 1 as described above also governs verbs with positive connotations, verbs like "prevent" generally follow Rule 3 much better than Rule 1.

Similarly, a subset of verbs in a language can be identified that follow this rule. For example, in English, verbs such as "solved", "resolve", "prevent", etc., generally exhibit such to behavior, and can be assembled into a third group, such that, at processing time, a verb can be checked for its group membership. If it is a member of this group, then, Rule 3 can be applied to determine the connotation of the text unit, together with the default connotation of the object noun.

Figure 17:
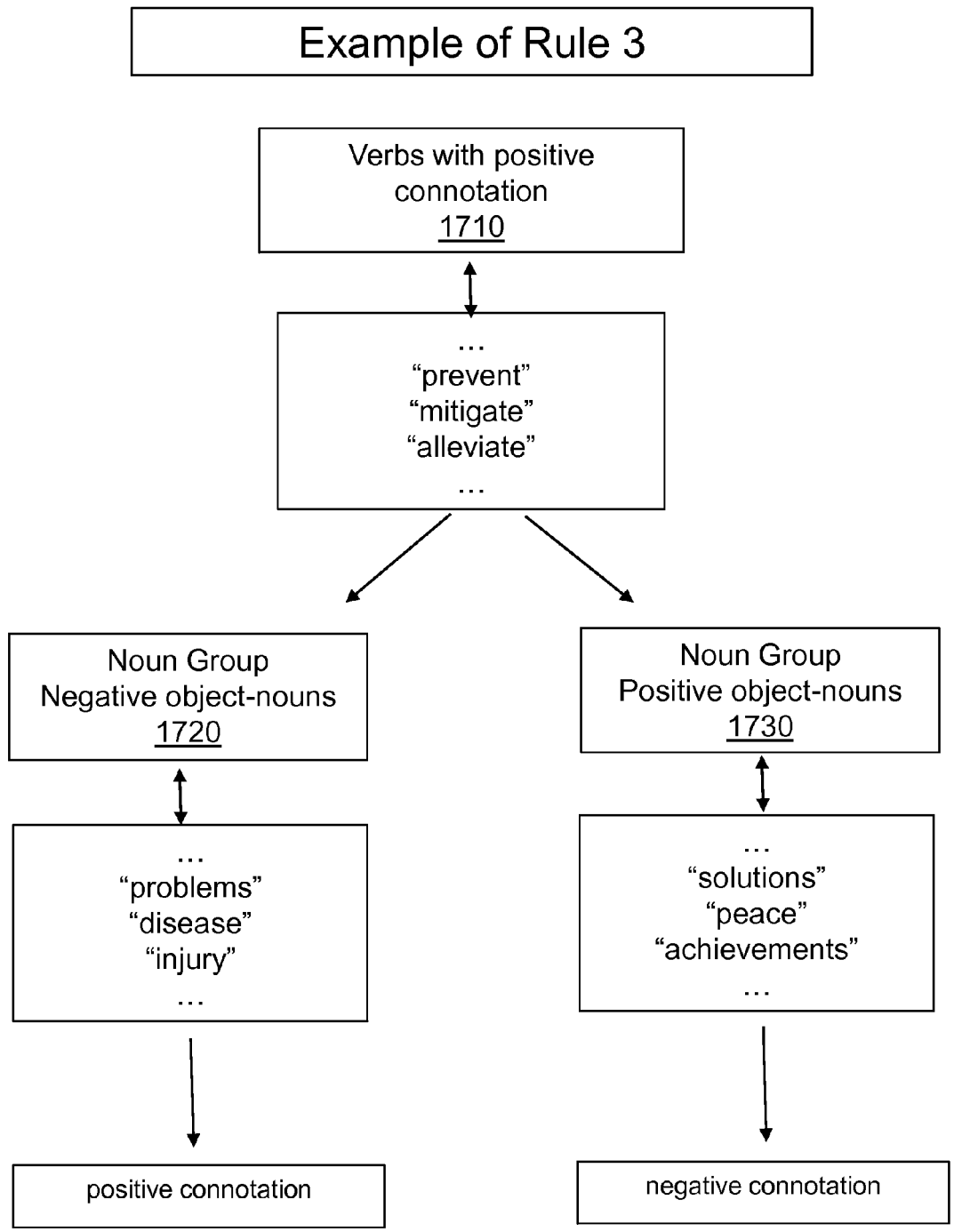
FIG. 17 illustrates one embodiment of Rule 3 in the present invention.

FIG. 17 illustrates one embodiment of Rule 3 in the present invention. Group 1710 comprises of verbs that have a positive connotation, Group 1720 comprises of object-nouns that have a negative connotation, and Group 1730 consists of object-nouns that have a positive connotation. A text unit comprising a verb from Group 1710 and an object from Group 1720 can be determined to have a positive connotation under Rule 3. A text unit comprising a verb from Group 1710 and an object from Group 1730 can be determined to have a negative connotation under Rule 3.

In some embodiments, a fourth rule can be defined as:

Assign a negative connotation to the text unit if the verb is associated with a negative connotation and the noun is associated with a negative connotation, or assign a positive connotation to the text unit if the verb is associated with a negative connotation and the noun is associated with a positive connotation.

Again, writing this rule in a more general form:

Rule 4:

Assign a negative connotation to the text unit if the first term is associated with a negative connotation and the second term is associated with a negative connotation, or assign a positive connotation to the text unit if the first term is associated with a negative connotation and the second term is associated with a positive connotation.

Examples of phrases where this rule is applicable can include "incur a loss", "cram junk food", and "cause trouble" on one hand as having negative connotations; and "provoke insights", "cram nutrition", etc. in the other hand as having positive connotations. In these instances, the verbs are generally perceived to have a negative connotation by default, and nouns may be negative or positive in some cases.

Similarly, a subset of verbs in a language can be identified that follow this rule. For example, in English, verbs such as "incur", "cram", "provoke", "cause", etc., generally exhibit such behavior, and can be assembled into a fourth group, such that, at processing time, a verb can be checked for its group membership. If it is a member of this group, then, Rule 4 can be applied to determine the connotation of the text unit, together with the default connotation of the object noun.

Figure 18:
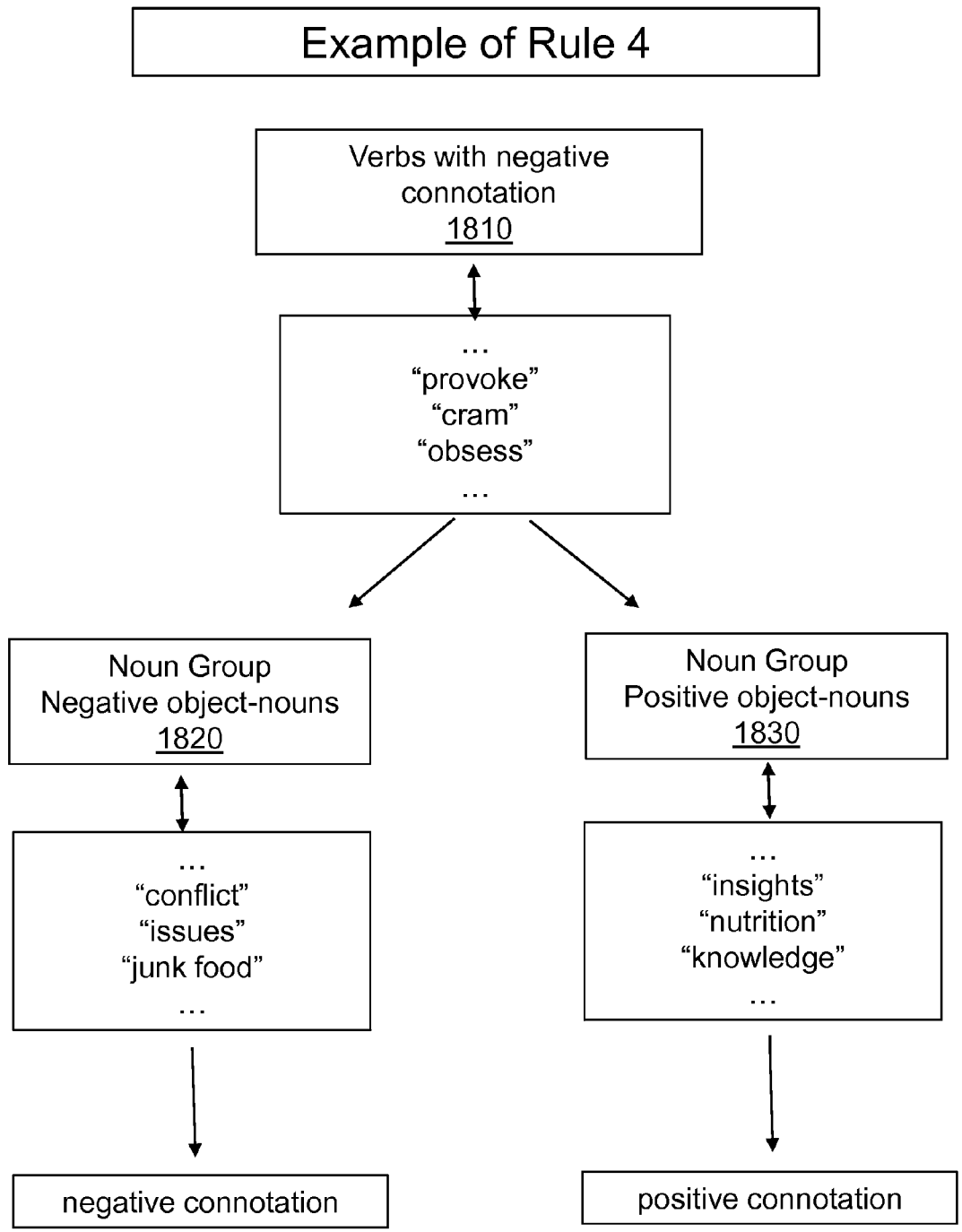
FIG. 18 illustrates one embodiment of Rule 4 in the present invention.

FIG. 18 illustrates one embodiment of Rule 4 in the present invention. Group 1810 comprises of verbs that have a negative connotation, Group 1820 comprises of object-nouns that have a negative connotation, and Group 1830 consists of object-nouns that have a positive connotation. A text unit comprising a verb from Group 1810 and an object from Group 1820 can be determined to have a negative connotation under Rule 4. A text unit comprising a verb from Group 1810 and an object from Group 1830 can be determined to have a positive connotation under Rule 4.

In some embodiments, a fifth rule can be defined as:

Assign a negative connotation to the text unit if the verb is associated with a negative connotation regardless of the connotation of the noun.

Writing this rule in a more general form:

Rule 5:

Assign a negative connotation to the text unit if the first term is associated with a negative connotation regardless of the connotation of the noun.

Examples of phrases where this rule is applicable can include "hate this book", "dislike that dish", etc. In these instances, the verbs are generally perceived to have a negative connotation by default, and the overall connotation of the text unit is usually not affected by the connotation of the object noun.

Similarly, a subset of verbs in a language can be identified that follow this rule. For example, in English, verbs such as "hate", "dislike", etc., generally exhibit such behavior, and can be assembled into a fifth group, such that, at processing time, a verb can be checked for its group membership. If it is a member of this group, then, Rule 5 can be applied to determine the connotation of the text unit, regardless of the connotation of the object noun.

Figure 19:
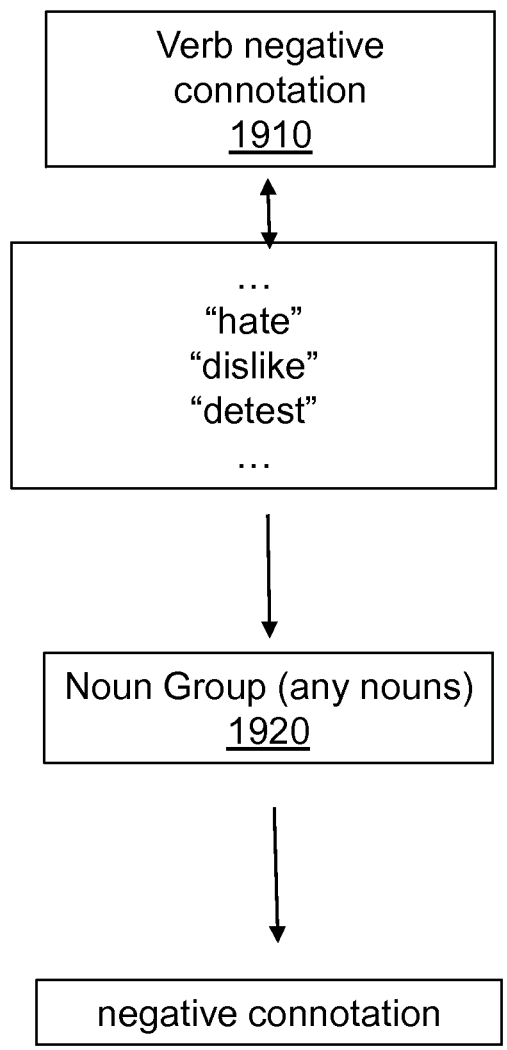
FIG. 19 illustrates one embodiment of Rule 5 in the present invention.

FIG. 19 illustrates one embodiment of Rule 5 in the present invention. Group 1910 comprises of verbs that have a negative connotation, and Group 1920 comprises of object-nouns. A text unit comprising a verb from Group 1910 and an object-noun from Group 1920 can be determined to have a negative connotation under Rule 5 without checking the default connotation of the object-noun.

In some embodiments, a sixth rule can be defined as:

Assign a positive connotation to the text unit if the verb is associated with a positive connotation regardless of the connotation of the noun.

Writing this rule in a more general form:

Rule 6:

Assign a positive connotation to the text unit if the verb is associated with a positive connotation regardless of the connotation of the noun.

Examples of phrases where this rule is applicable can include "enjoyed this book", "delighted his friends", and "applauded him", etc. In these instances, the verbs are generally perceived to have a positive connotation by default, and the overall connotation of the text unit is usually not affected by the connotation of the object noun.

Similarly, a subset of verbs in a language can be identified that follow this rule. For example, in English, verbs such as "enjoy", "love", "delight", etc., generally exhibit such behavior, and can be assembled into a sixth group, such that, at processing time, a verb can be checked for its group membership. If it is a member of this group, then, Rule 6 can be applied to determine the connotation of the text unit, regardless of the connotation of the object noun.

Figure 20:
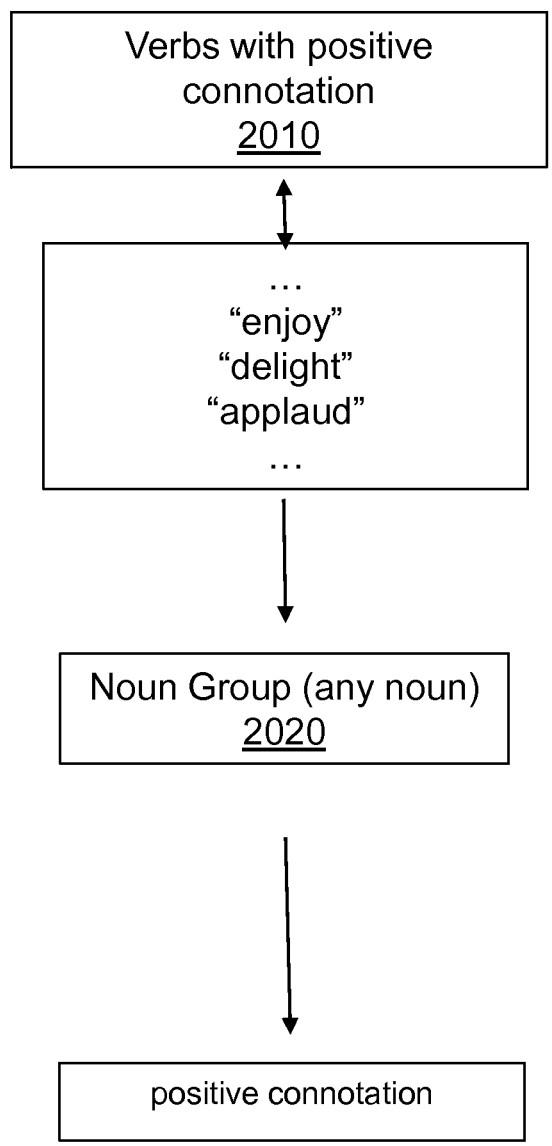
FIG. 20 illustrates one embodiment of Rule 6 in the present invention.
Figure 22:
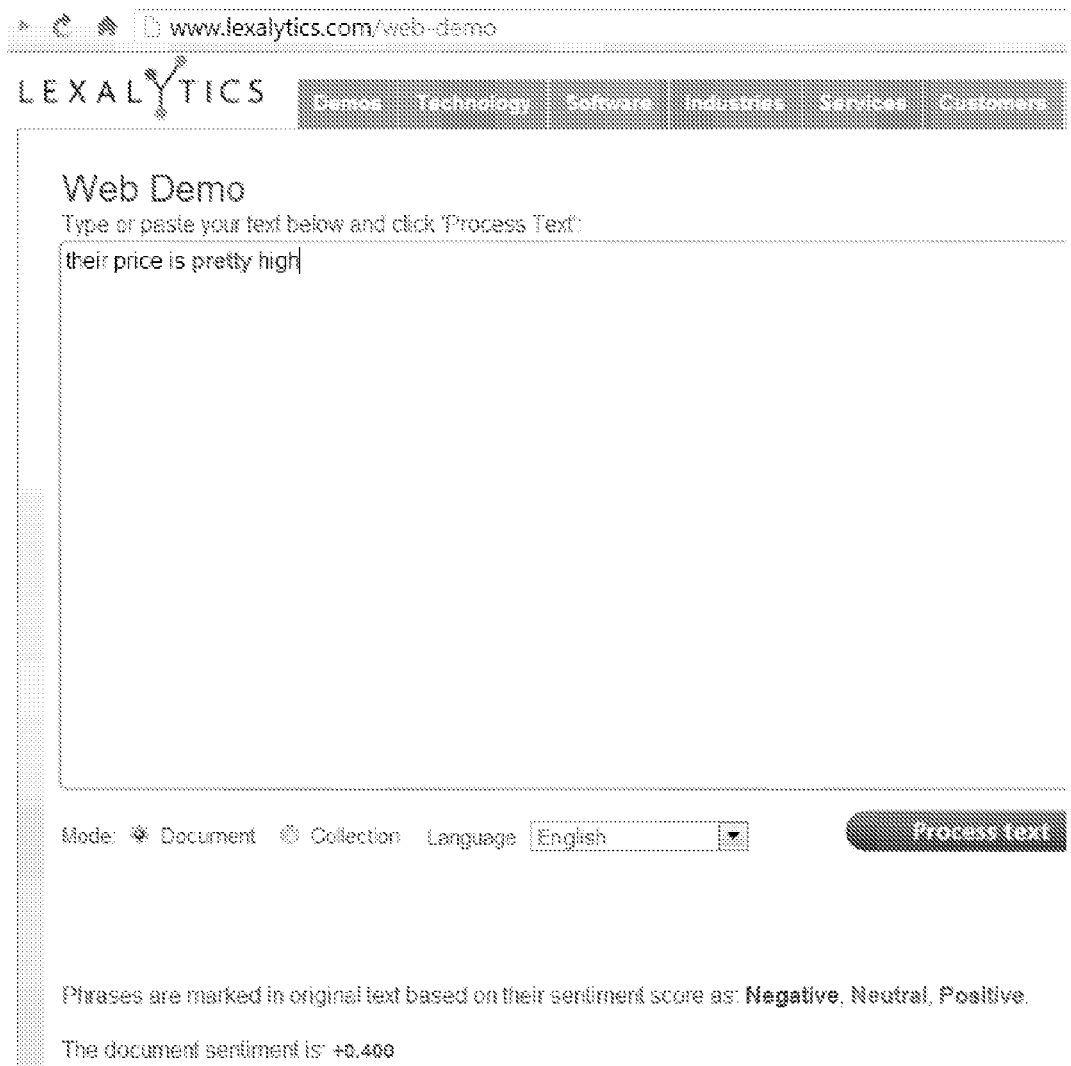
FIG. 22 is a screenshot of commercial web site showing a demo result using an approach in the current market.

FIG. 20 illustrates one embodiment of Rule 6 in the present invention. Group 2010 comprises of verbs that have a positive connotation, and Group 2020 comprises of object-nouns. A text unit comprising a verb from Group 2010 and an object-noun from Group 2020 can be determined to have a positive connotation under Rule 6 without checking the default connotation of the object-noun.

In some embodiments, a group of verbs that has more members can be set as default, such that, only a small portion of the verbs in a language need to be checked for group membership at processing time, while the rest of the verbs can apply a default rule without checking their group membership.

In some other embodiments, certain rules and the corresponding verb groups can be merged to simplify the process of representation, such as Rule 1 and Rule 2 can be merged, and verbs associated with Rule 1 and Rule 2 can be merged into a single group as well.

A Subject Noun with a Verb

In addition to the expressions with verb+object structure as described above, in some other embodiments, the present invention provides methods for determining the connotation of a text unit that comprises a subject noun and a verb. For example, the phrase "the problem disappeared", or "the symptoms improved" is such an expression as a text unit, in which the term "problem" or "the problem", and "symptoms" and "the symptoms" are the subject while the terms of "disappeared" and "improved" are verbs.

The methods and rules described above for a text unit having a verb+object structure can also be applied to a text unit having a subject+verb structure.

For example, for the verbs in the third group mentioned above which are associated with Rule 3 that have a default positive connotation, such as the verbs "prevent", "solve", etc., when used with a subject noun in a phrase such as in "the disease was prevented", or "the problem is solved", or "their achievements were prevented by the lack of support", Rule 3 can be applied where the verb is the first term and the subject is the second term.

With the above example, a note is in order regarding the definition of the grammatical "subject" or "object". The English language distinguishes a sentence in an active voice from a sentence in a passive voice. The sentence of "the problem is solved" is in a passive voice, in which the grammatical subject is still "the problem", even though semantically, it is more of an object of the verb "solve". In the present disclosure, the definition of the subject and object follows this convention.

Similarly, for verbs in the second group associated with Rule 2 that have a negative connotation by default, when used in text units such as "the storm subsided", and "the damage was minimized", Rule 2 can be applied where the verb is the first term which has a negative connotation, and the subject is the second term which has a negative connotation, making the overall connotation positive.

Generally, all six rules as exemplified with the verb+object structure can be applied to the subject+verb structure, thus more detailed examples are omitted here, as they are described above.

A First Noun with a Second Noun

In the English language, there is a linguistic structure comprising a first noun and a second noun, or noun+noun structure. For example, the expressions of "disease prevention", or "issue resolution", or "benefit reduction", etc., have this type of first noun+second noun structure, and the connotation of the entire structure may or may not be the same as the component nouns, but Rules 1 to 6 as described above can still hold in similar fashion in such cases by applying the rules where the second noun in the noun+noun structure is the first term, and the first noun in the structure is the second term. For example, in the expression of "disease prevention", the first noun of "disease" can have a negative connotation, and the second noun of "prevention" can have a positive connotation, and the entire expression can have a positive connotation which can be determined by applying Rule 3 to a first noun+second noun structure.

On the other hand, in the expression of "benefit reduction", the first noun of "benefit" can have a positive connotation, and the second noun of "reduction" can have a negative connotation, and the entire expression can have a negative connotation which can be determined by applying Rule 2.

Similarly, the connotation of noun+noun expressions such as "the risk increase", or "the benefit increase", etc, can be determined by applying Rule 1.

The connotation of noun+noun expressions such as "damage aggravation", or "symptoms worsening", can be determined by applying Rule 4.

A First Noun with a Preposition and a Second Noun

In the English language, there is a similar linguistic structure comprising a first noun and a preposition and a second noun, or noun+preposition+noun structure. For example, the expressions of "the prevention of disease", or "the resolution of issues", or "the reduction of benefit", etc., have this type of first noun+preposition+second noun structure, and the connotation of the entire structure may or may not be the same as the component nouns, but Rules 1 to 6 as described above can still apply to such cases where the first noun in the structure is the first term, and the second noun in the structure is the second term. For example, in the expression of "the prevention of disease", the first noun of "prevention" can have a positive connotation, and the second noun of "disease" can have a negative connotation, and the entire expression can have a positive connotation which can be determined by applying Rule 3.

On the other hand, in the expression of "the reduction of benefit", the first noun of "reduction" can have a negative connotation, and the second noun of "benefit" can have a positive connotation, and the entire expression can have a negative connotation which can be determined by applying Rule 2.

Similarly, the connotation of noun+preposition+noun expressions such as "the increase of risk", or "the increase of benefit", etc, can be determined by applying Rule 1.

Furthermore, the connotation of noun+preposition+noun expressions such as "the aggravation of damage", or "the worsening of symptoms", etc, can be determined by applying Rule 4 with the first noun being the first term, and the second noun being the second term.

In some embodiments, similar to the case with verb+object structure, some rules can be merged for a simplified representation when the connotation value of the verb is not critical to the implementation, and the connotation of the entire expression can be determined by identifying the membership of the verb, or the first noun, or the second noun in one of the groups as described above. For example, Rule 1 and Rule 2 can be merged as a single rule based on how each rule is applied to second nouns, and the first and the second groups can be merged into a single group, without distinguishing whether the default connotation of a first noun or the second noun in the group is positive or negative, or neutral.

An Adjective Modifying a Noun

In some other embodiments, the present invention further provides methods for determining the connotation or sentiment type of additional linguistic structures.

In the English language, a common structure is a noun phrase comprising an adjective and a noun, with the adjective as a modifier of the noun, while the noun can be called the head of the noun phrase. For example, in the phrase "digital camera", the word "digital" is an adjective modifying the noun "camera", while the noun "camera" can be called the head of the phrase. While each component term of the phrase may have its own connotation type, the connotation or sentiment type of the entire noun phrase as an expression or structure often cannot be easily determined by looking up the connotations of the component terms of the adjective or the head noun. For example, the adjective of "high" is often perceived as having a positive connotation, such as in "the quality is high" or "the standard is high" or "I think of him highly". However, not all phrases with the word "high" as the adjective will have a positive connotation. For example, in the phrase of "high price", or "high blood pressure", the phrase is generally perceived as having a negative connotation, even though the word "high" may have a positive connotation. Whether the phrase as a whole will have a positive or negative connotation depends on the specific context. In the present invention, such context can also be handled by certain rules. The present invention provides methods for appropriately determining the connotation or sentiment type of phrases with this type of structure.

In the present invention, subsets of adjectives and nouns in a language are assembled into different groups. In some embodiments, a first group of adjectives is set up to include a subset of adjectives in the language, each of the adjectives in this group is associated with a generally perceived positive connotation, and can be treated as having a positive connotation when used alone or in certain neutral context. Examples of such adjectives in the English language can include terms like "high", "quick", "fast", "large", "big", etc. Furthermore, a first group of nouns can also be set up to include a subset of nouns in the language, such as the terms of "quality", "standard", "value", "response", "support", etc., in the English language, each of which may be treated as to carry either a positive or neutral connotation. An algorithmic rule can be set up to determine the connotation of a phrase having the structure of adjective+noun. For example, a rule for this can be like the following:

(Rule 7): If the adjective is a member of the first group and if the noun is a member of the first noun group, then, assign a positive connotation to the phrase having a structure of adjective+noun.

Furthermore, a second group of nouns can be assembled to include another subset of nouns in the language, each of which may be treated as carrying either a negative or neutral connotation. Examples of nouns for the second noun group can include nouns such as "price", "blood pressure", and "cholesterol", etc., in the English language. And an algorithmic rule can be set up to determine the connotation of a phrase having the structure of adjective+noun. For example, a rule for this can be like the following:

(Rule 8): If the adjective is a member of the first group and if the noun is a member of the second noun group, then, assign a negative connotation to the phrase having a structure of adjective+noun.

Furthermore, a third group of nouns can be assembled to include another subset of nouns in the language, each of which may be treated as carrying a neutral connotation. Examples of nouns for the third noun group can include nouns such as "rise", "level", "size", and "exit", etc., in the English language, for phrases like "high rise", "high level", large size", "quick exit", etc., which are generally perceived to be neutral in connotation. And an algorithmic rule can be set up to determine the connotation of a phrase having the structure of adjective+noun. For example, a rule for this can be like the following:

(Rule 9): If the adjective is a member of the first group and if the noun is a member of the third noun group, then, assign a neutral connotation to the phrase having a structure of adjective+noun.

In some embodiments, a second group of adjectives is also set up to include a subset of adjectives in the language, each of the adjective in this group are associated with a generally-perceived negative connotation, and can be treated as having a negative connotation when used alone or in certain neutral context. Examples of such adjectives can include terms like "low", "slow", "small", "dark", etc. The membership of a noun in the first, second and third group of nouns as described above can also be used in determining the connotation of the phrase. For example, when nouns of the first group such as the terms of "quality", "standard", "value", "response", etc., are used with the second group of adjectives, they form phrases like "low quality", "low standard", "slow response", etc., and can generally be assigned a negative connotation. An algorithmic rule can be set up to determine the connotation of a phrase having the structure of adjective+noun. For example, a rule for this can be like the following:

(Rule 10): If the adjective is a member of the second group and if the noun is a member of the first noun group, then, assign a negative connotation to the phrase having a structure of adjective+noun.

Furthermore, when nouns of the second group such as "price", "expense", "consumption", etc., are used with the second group of adjectives, they form phrases like "low price", "low expense", "slow consumption", etc., and can generally be assigned a positive connotation. An algorithmic rule can be set up to determine the connotation of a phrase having the structure of adjective+noun. For example, a rule for this can be like the following:

(Rule 11): If the adjective is a member of the second group and if the noun is a member of the second noun group, then, assign a positive connotation to the phrase having a structure of adjective+noun.

Furthermore, when nouns of the third group such as "rise", "water level", "size", and "exit", etc., are used with the second group of adjective, they form phrases like "low rise", "low water level", small size", "slow exit", etc., which are generally perceived to be neutral in connotation. And an algorithmic rule can be set up to determine the connotation of a phrase having the structure of adjective+noun. For example, a rule for this can be like the following:

(Rule 12): If the adjective is a member of the second group and if the noun is a member of the third noun group, then, assign a neutral connotation to the phrase having a structure of adjective+noun.

As can be seen from the above description, the third group of nouns can be optional, or to be the default if a noun is not a member of the first or the second noun group, and in such cases, the connotation of the phrase can be determined to be neutral no matter which adjective group the adjective is a member of, and in such cases, Rule 12 and Rule 9 can be omitted.

In some embodiments, adjective groups other than the first and second adjective groups as described above can be set up, and noun groups other than the first and second noun groups as is described above can also be set up. The principle of the methods provided by the present invention is to determine the connotation of the phrase based on the context in terms of what type of adjectives are modifying what type of nouns, and apply rules to capture certain linguistic patterns.

For the adjective+noun structure, especially when the third group of nouns are omitted as described above, a simplified method is to use Rules 1 to 6 as described above. In this case, the adjective can be the first term and the noun can be the second term. Generally, the same effect can be achieved by applying Rules 1 to 6 for the adjective+noun structure.

A Subject Noun with Adjective as Predicative

The method for the phrase with the structure of adjective+noun can also be applied to structures such as subject+be+adjective, in which the adjective is sometimes known as a "predicative", while the "be" is known as a "linking verb". For example, sentences like "the price is high" and "the quality is high" are of this type of structure. In determining the connotation of sentence like these, the rules for the adjective+noun structure as described above can also be applied. For example, in "the price is high", the noun is a member of the second noun group, and the adjective is a member of the first adjective group, and by applying Rule 8, the sentence is assigned a negative connotation. Similarly, in the sentence "the quality is high", the noun is a member of the first noun group, and the adjective is a member of the first adjective group; and by applying Rule 7, the sentence is assigned a positive connotation. Furthermore, in the sentence "the quality is low", the noun is a member of the first noun group, and the adjective is a member of the second adjective group; and by applying Rule 10, the sentence is assigned a positive connotation. Other rules can also apply to other combinations of the adjective group and the noun group for this type of subject+be+adjective structure.

Similarly, a simplified method is to use Rules 1 to 6 as exemplified with verb+noun structure in the same way as the rules are used for other structures as described above. In this case, the adjective can be the first term and the subject can be the second term. Generally, the same effect can also be achieved by applying Rules 1 to 6 for the subject+be+adjective structure.

An Adjective Followed by a Preposition and a Noun

The method for the phrase with the structure of adjective+noun can also be applied to structures such as adjective+preposition+noun. For example, the phrases such as "high in quality", "low in price", as in the sentence "The product is high in quality and low in price", or "high in price", or "low in quality" are of this type. In determining the connotation of structures like these, the rules for the adjective+noun structure as described above can also be applied. For example, in the phrase "high in price", the noun is a member of the second noun group, and the adjective is a member of the first adjective group, and by applying Rule 8, the phrase is assigned a negative connotation. Similarly, in the sentence "high in quality", the noun is a member of the first noun group, and the adjective is a member of the first adjective group; and by applying Rule 7, the phrase is assigned a positive connotation. Furthermore, in the phrase "low in quality", the noun is a member of the first noun group, and the adjective is a member of the second adjective group; and by applying Rule 10, the sentence is assigned a positive connotation. Other rules can also apply to other combinations of the adjective group and the noun group for this type of adjective+preposition+noun structure.

Similarly, a simplified method is to use Rules 1 to 6 as described above. In this case, the adjective can be the first term and the noun can be the second term. Generally, the same effect can also be achieved by applying Rules 1 to 6 for the adjective+preposition+noun structure.

An Adjective Followed by a Preposition and a Verb

The method for the phrase with the structure of adjective+noun can also be applied to structures such as adjective+preposition+verb in a similar manner. For example, the phrases such as "easy to use" or "difficult to build" as in the sentence "The device is easy to use, but difficult to build" are of this type. In determining the connotation of structures like these, the rules for the adjective+noun structure as described above can also be applied by changing the noun to a verb, and setting up different verb groups to match the corresponding adjective groups. For example, different verb groups can be set up to include subsets of verbs in a language, and the connotation of the phrase can be determined by checking whether the adjective is a member of a particular adjective group, and whether the verb is a member of a particular verb group, in a way similar to the methods described above for nouns and adjective; and corresponding rules can be set up for application in different embodiments to assign the contextualized connotation of the phrase.

Similarly, a simplified method is to use Rules 1 to 6 as exemplified with verb+noun structure in the same way as the rules are used for other structures as described above. In this case, the adjective can be the first term and the verb can be the second term. Generally, the same effect can also be achieved by applying Rules 1 to 6 for the adjective+preposition+verb structure.

It should be noted that the above descriptions are only examples of the most common cases based on the English language. The principles and methods disclosed in the present invention can be applied to other structures not exhaustively described in the present disclosure, while variations of the principles and methods can be employed without deviating from the spirit of the present invention.

Alternative Embodiments

In some embodiments, the default connotation of the verb or nouns or adjectives in such groups is not checked when determining the contextualized connotation of the text unit. For instance, in the case of verbs in a language, a first group, call it Group A, of verbs are identified as a subset of verbs in a language. Members of this verb group can have a common semantic or conceptual attribute or characteristics of signifying a process of increase or creation. For example, in the English language, verbs such as increase, create, grow, heighten, rise, strengthen, appear, etc., can belong to this group of verbs. A rule can be established to determine the contextualized connotation of the text unit comprising a verb+object structure. Once the membership of the verb is identified, the contextualized connotation of the text unit can be determined according to the connotation of the object noun. For example, if the object noun has a positive connotation, then the contextualized connotation of the text unit can be determined to be also positive, such as in the text unit "increase benefit", etc., and if the object noun has a negative connotation, then the contextualized connotation of the text unit can be determined to be also negative, such as in the text unit "increase cost", etc., and in some cases, if the object noun has a neutral connotation, then the contextualized connotation of the text unit can be determined to be also neutral, such as in the text unit "increase size", etc. An algorithmic rule can be set up to capture this pattern. For example, If a verb is a member of Group A, then, assign a positive connotation to the text unit if the connotation of the object noun is positive; or assign a negative connotation to the text unit if the connotation of the object noun is negative.

This rule can be written in a more general form involving a general Group A for more than just verbs and a first term and second term of a multi-term text unit to take into account different grammatical forms of text units other than verb+object structures:

Rule 13:

If the first term is a member of Group A, assign a negative connotation to the text unit if the second term is associated with a negative connotation, or assign a positive connotation to the text unit if the second term is associated with a positive connotation.

In some embodiments, a second group, call it Group B, of verbs are identified as another subset of verbs in a language. Members of this verb group can have a common semantic or conceptual attribute or characteristics of signifying a process of decrease or disappearance or destruction. For example, in the English language, verbs such as decrease, disappear, destroy, lower, reduce, weaken, etc., can belong to this group of verbs. A rule can be established to determine the contextualized connotation of the text unit comprising a verb of this group and an object noun. Once the membership of the verb is identified, the contextualized connotation of the text unit can be determined according to the connotation of the object noun. For example, if the object noun has a positive connotation, then the contextualized connotation of the text unit can to be determined to be negative, such as in the text unit "reduce benefit", etc.; and if the object noun has a negative connotation, then the contextualized connotation of the text unit can be determined to be positive, such as in the text unit "reduce cost", etc.; and in some cases, if the object noun has a neutral connotation, then the contextualized connotation of the text unit can be determined to be also neutral, such as in the text unit "reduce size", etc. Similarly, a generalized is rule similar to Rule 13 can be set up to capture this pattern.

Rule 14:

If the first term is a member of Group B, assign a negative connotation to the text unit if the second term is associated with a positive connotation, or assign a positive connotation to the text unit if the second term is associated with a negative connotation.

The same grouping methods and rules apply to verbs in a text unit with the subject+verb structure, to nouns in a text unit with the first noun+second noun structure, and to nouns in a text unit with the first noun+preposition+second noun structure.

In the case of a text unit having a structure of subject+verb, once the membership of the verb is identified, the contextualized connotation of the text unit can be determined according to the connotation of the subject noun. For example, when the verb is a member of the first group or Group A, if the subject noun has a positive connotation, then the contextualized connotation of the text unit can be determined to be also positive, such as in the text unit "the benefit increased". If the subject noun has a negative connotation, then the contextualized connotation of the text unit can be determined to be also negative, such as in the text unit "the cost increased", and in some cases, if the subject noun has a neutral connotation, then the contextualized connotation of the text unit can be determined to be also neutral, such as in the text unit "the size increased". Rule 13 can be used for this structure with the verb being the first term and the subject being the second term.

Similarly, when the verb is a member of the second group or Group B, the contextualized connotation of the text unit can be determined according to the connotation of the subject noun, but with the second rule. For example, if the subject noun has a positive connotation, then the contextualized connotation of the text unit can be determined to be negative, such as in the text unit "the benefit is reduced"; if the subject noun has a negative connotation, then the contextualized connotation of the text unit can be determined to be positive, such as in the text unit "the cost is reduced"; and in some cases, if the subject noun has a neutral connotation, then the contextualized connotation of the text unit can be determined to be also neutral, such as in the text unit "the size is reduced". In this case, Rule 14 can be applied with the verb being the first term and the subject being the second term.

In the case of text unit having a structure of first noun+ second noun, such as "benefit reduction", or "cost reduction", the second noun is conceptually similar to the verb in the second group or Group B, and in fact, many of such nouns can be morphologically derived from their corresponding verbs, such as "reduction" being derived from the verb "reduce", etc. Similar to the methods used for verbs, a first and second group of nouns can be identified for the second noun in the structure, and once the membership of the second noun is identified, the contextualized connotation of the text unit can be determined according to the connotation of the first noun. For example, when the second noun is a member of the first group, if the first noun has a positive connotation, then the contextualized connotation of the text unit can be determined to be also positive, such as in the text unit "benefit increase"; if the first noun has a negative connotation, then the contextualized connotation of the text unit can be determined to be also negative, such as in the text unit "cost increase"; and in some cases, if the first noun has a neutral connotation, then the contextualized connotation of the text unit can be determined to be also neutral, such as in the text unit "size increase". Similarly, Rules 13 and 14 can generally be applied respectively with the second noun being the first term and the first noun being the second term.

In the case of text units having a structure of first noun+ preposition+second noun, such as "reduction of benefit", or "reduction of cost", the first noun is conceptually similar to the verb in the first group. Similar to the methods used for noun+noun structure above, once the membership of the first noun is identified, the contextualized connotation of the text unit can be determined according to the connotation of the second noun. For example, when the first noun is a member of the first group, if the second noun has a positive connotation, then the contextualized connotation of the text unit can be determined to be also positive, such as in the text unit "increase of benefit"; if the second noun has a negative connotation, then the contextualized connotation of the text unit can be determined to be also negative, such as in the text unit "increase of cost"; and in some cases, if the second noun has a neutral connotation, then the contextualized connotation of the text unit can be determined to be also neutral, such as in the text unit "increase of size". Similarly, Rules 13 and 14 can generally be applied respectively with the first noun being the first term and the second noun being the second term.

Similarly, for text units that have an adjective+noun structure, a first group of adjectives can be identified. This group of adjectives can usually be those that conceptually signify a state of certain things having an increasing or creation tendency, or implying a connotation that may more likely to be perceived as positive, such as the adjectives of "high", "fast", "long", "large", "strong", etc. And a second group of adjectives can be identified to include those adjectives in a language that conceptually signify a state of certain things have a decreasing or diminishing tendency, or implying a connotation that may more likely to be perceived as negative, such as the adjectives of "low", "slow", "short", "small", "weak", etc. And a third group of adjectives can be identified to include those adjectives in a language that conceptually signify a balanced state of certain things, or implying a connotation that may more likely to be perceived as either neutral or slightly on the positive side, such as the adjectives of "common", "normal", "medium", "ordinary", "stable", etc.

Furthermore, a first group of nouns can be identified to include a subset of nouns in a language that usually are conceptually associated with names of things that provide or increase useful resources, such as "quality", "support", "growth rate", "income", "life", etc. And a second group of nouns can be identified to include a subset of nouns in a language that usually are conceptually associated with names of things that reduce or decrease useful resources, such as "cost", "consumption", "expense", "wait", etc. And a third group of nouns can be identified to include a subset of nouns in a language that are not conceptually associated with names of things that either create or consume useful resources, but more likely with name of attributes or states of things, such as "speed", "size", "weight", "water level", "blood pressure", etc.

With the above groups identified, the contextualized connotation of text units having a structure of adjective+noun can be determined by the group membership of the adjective and the noun. For example, if the adjective is a member of the first adjective group; and if the noun is a member of the first noun group, then the connotation of the text unit can be determined to be positive, such as in "high quality", "long life", etc. And if the adjective is a member of the first adjective group; and if the noun is a member of the second noun group, then the connotation of the text unit can be determined to be negative, such as in "high cost", "long wait", etc.

If the adjective is a member of the second adjective group; and if the noun is a member of the first noun group, then the connotation of the text unit can be determined to be negative, such as in "low quality", "weak support", etc. If the adjective is a member of the second adjective group, and if the noun is a member of the second noun group, then the connotation of the text unit can be determined to be positive, such as in "low cost" "short wait", etc.

If the adjective is a member of the third adjective group, and if the noun is a member of the third noun group, then the connotation of the text unit can be determined to be either positive, such as in "normal weight", "stable support", etc., or neutral such as in "ordinary speed", "medium size", etc.

Other combinations of adjective and noun groups can be handled with finer granulated sub-groupings to handle certain special cases, such as some nouns in the third noun group like "blood pressure", which can be negative with both the first and second group of adjectives, as in "high blood pressure", and "low blood pressure", while other nouns in the third noun group can be either positive, negative, or neutral with the first and second group of adjectives, such as in "high speed", "low speed", etc., depending on additional contextual information.

Similarly, in cases when the third groups of adjectives and nouns are not critical and can thus be omitted, Rules 13 and 14 above can generally be applied respectively with the adjective being the first term and the noun being the second term.

The above described methods of grouping nouns, verbs, and adjectives, etc., are only examples for illustrating the principle of the methods of the present invention. Combinations of other grammatical components or parts of speech are not exhaustively exemplified here. However, the basic principle of grouping words in a language based on certain semantic or conceptual attributes or characteristics, and setting up rules for combination of words in different groups for the purpose of determining contextualized connotation or sentiment type of text unit of various syntactic structures can apply to various other combinations or text unit with various other structures.

In some embodiments, the verbs or nouns or adjectives in separate groups as described above are not separately assembled into individual or mutually exclusive groups or lists. Instead, the group memberships of such verbs or nouns or adjectives are treated as attributes or labels or tags of the terms, and such terms can be labeled or marked in their original dictionary as having membership to one or more groups, and such attributes can be retrieved at processing time.

One advantage of the present invention is the higher accuracy in gauging sentiment over conventional approaches. As is mentioned above, conventional approaches are limited to single-word dictionary lookup for determining the connotation or sentiment type of user expressions. For example, for the sentence "The price is pretty high", the conventional approach will consider this sentence as being positive in sentiment, due to the commonly perceived positive connotation or sentiment type of words in the sentence like "pretty", and "high", as can be seen from certain websites at the time of this writing, where the individual words like "pretty" are highlighted in a special color to indicate a positive sentiment, and the overall sentiment level of the expression is incorrectly determined as being positive.

In contrast, in the present invention, context information is taken into account, and sentences like "The price is pretty high" will accurately be determined to have a negative connotation or sentiment type, due to the use of "high" in the context of "price", as well as overriding the default positive connotation of "pretty" in such a context.

The results from the present invention can be output for further analysis, such as statistical analysis, and trend prediction when a large amount of social data is analyzed. Compared with conventional approaches that do not perform contextualized analysis, the methods of the present invention can provide much enhanced results for such purposes.

The context-based connotation or sentiment type determination using the methods of the present invention can be used for various purposes in addition to displaying and highlighting the text unit that carry positive or negative opinion, including document tagging, classification, reporting, and statistical analysis, and trend predication. The connotation or sentiment type of each text unit in such text contents can be combined to produce an overall sentiment gauge carried in the text content, or in multiple text content, such as surveys, social network comments, emails, SMS, phone conversation transcripts, social network comment, etc.

One particular application of the present invention is for more advanced search engines to be able to let users search by sentiment type or use opinion on certain things.

In some embodiments, the present invention first process the text data in the search repository, and identify information about various types of text units contained in a plurality of documents that are associated with an search index. Instead of simply indexing the keywords contained in the documents as is done by conventional search methods, the present invention can identify the linguistic structural features of the text and context, such as the various structures for contextualized connotation or sentiment type analysis as described above. One particular structure is the "subject+linking verb+adjective", or "subject+predicative". When the subject term of the text, and the connotation or sentiment type of the structure can be correctly identified using the method of the present invention, the search engine can enable search queries such as "search positive comments on iPhone", or "search negative comments on iPad", or "search positive or negative comments on drug X", etc. The search engine can match keywords such as "iPhone", "iPad", "Drug X" with the terms in the text that are the subject of text units, and select those terms that are the predicative, or other "verb+object" units as the predicate of the subject terms in the corresponding text units.

For example, if the contents in the search repository contain sentences such as "My iPhone is great", "My iPad is terrible", or "Drug X has bad side effects", or "Drug X help me a lot", etc., in response to the above example queries, result such as "great", "terrible", "has bad side effects", "help me a lot", etc., can be returned for the respective queries. Such search features are generally not available in the current market, but with the system and methods of the present invention, such features can be enabled; result can be displayed to the user in various ways, and the users can be better served.

The methods disclosed in the present invention can be implemented on a computer system.

Figure 23:
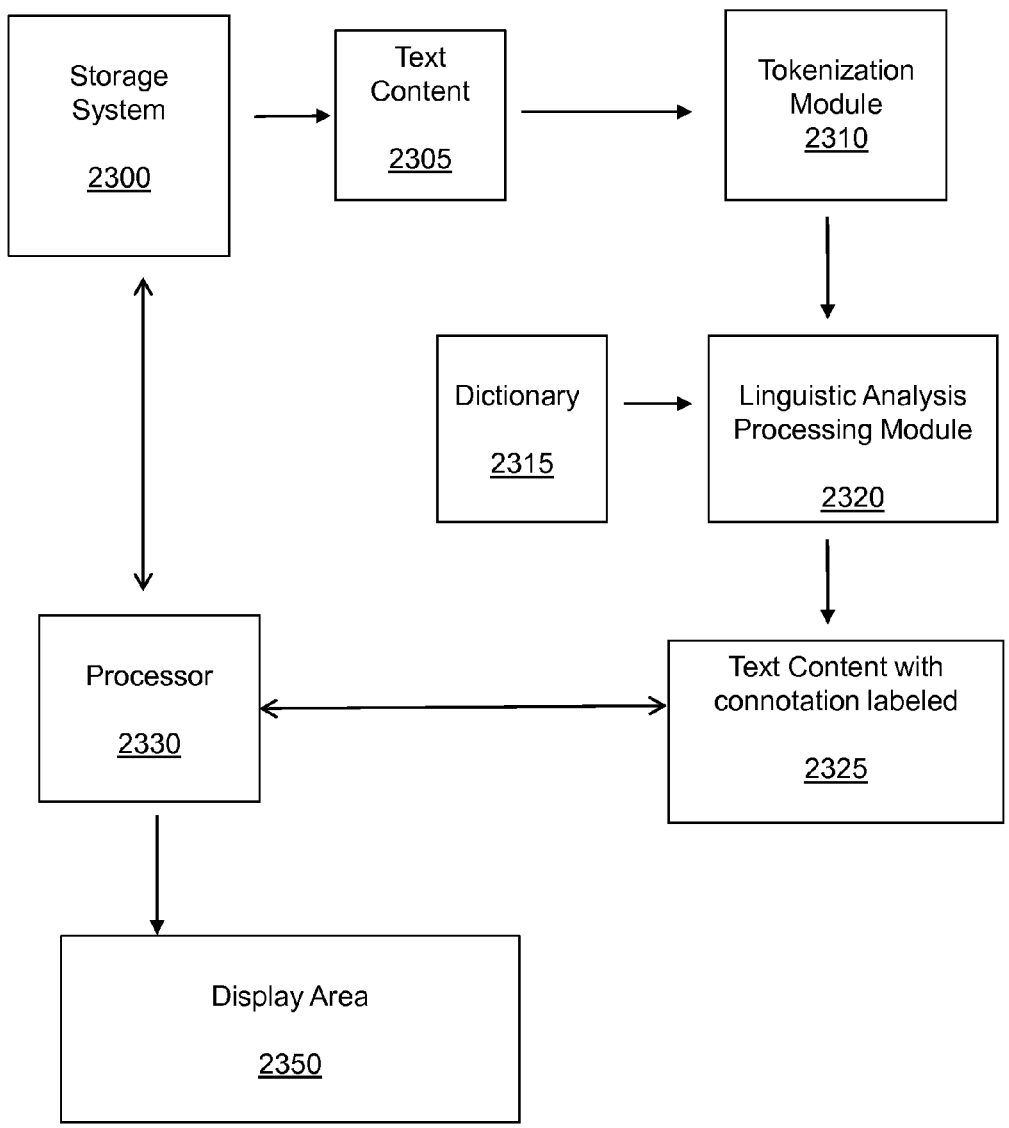
FIG. 23 is an illustration of modules of a computer system used for processing a text content in accordance with the present invention.

FIG. 23 is a system diagram illustrating the general functional components and steps of one embodiment of the present invention.

In FIG. 23, a text content 2305, such as a document of any type, is obtained by the system from a computer storage 2300, or optionally from a user interface. The text content is then tokenized to produce a plurality of tokens by the tokenization module 2310, each of which can be a word or a phrase. In a general sense, a token can be an instance of a term that can have more than one token in the text content, for example, the word "good" may occur in more than one time in the content, and each occurrence is a token instance of the term "good".

Next, a linguistic analysis is performed by the linguistic processing module 2320 to identify the grammatical or semantic or contextual attributes of the tokens. In some embodiments, a parser of certain type can be used for the analysis. The parser can use a dictionary 2315 to aid its analysis. In some other embodiments, certain attributes can also be directly obtained by a dictionary lookup, such as the default connotation of a term, whether it is positive, negative, or neutral.

Then, the grammatical, semantic, contextual, or connotation attributes obtained from either the parser, or direct dictionary lookup can be used for determining the connotation or sentiment type of the text unit using the methods of the present invention by the processor 2330. And the results can be either text labeled with the connotation type, or extracted for statistic analysis and reports; or be output to either the user interface 2350 for display, or for storage.

As has been mentioned above, the examples of both the methods and the applications in various fields or for various purposes are for illustration purposes. The applicable cases of both the methods and the applications are not exhaustively listed. However, it should be understood that the principles, systems, methods, and applications disclosed in the present disclosure can be applied to similar cases that are not listed here; and can have variations in formats without deviating from the spirit of the present invention.

A System for Highlighting or Extracting Text Units Based on Contextualized Connotation In the parent patent application of the present application as cited and referenced above, system and methods are disclosed for selectively highlighting, displaying and extracting text units associated with certain topical, grammatical or semantic attributes. One of the applications is to selectively highlight or extract text unit that carry either a positive or negative opinion or sentiment type. A key feature in the parent patent application of the present application is to to identify the scope of context for such highlighting or extracting, such that, the elements being highlighted or extracted are contextually correct or meaningful. This includes the correct identification of the opinion or sentiment type carried by a phrase or sentence, rather than by individual words in the phrase or sentence. The present invention provides methods for identifying such meaningful units with various structure types, and based on the identification, such meaningful units can be highlighted or extracted as a whole rather than as individual words for information utilization.

The results produced using the methods of the present invention can be displayed, highlighted or selectively highlighted, or extracted for storage, using the system disclosed in the parent patent application of the present disclosure.

What is claimed is:

1. A method implemented on a computer comprising a processor, and for performing actions on a multi-term text unit based on a derived semantic attribute or attribute value, the method comprising:
    receiving a text content comprising multiple text units, each text unit comprising at least a portion of a phrase or a sentence consisting of multiple terms, each term comprising a word or a phrase in a language;
    identifying, in the text content, a text unit, wherein the text unit comprises a first term and a second term, wherein neither the first term nor the second term includes a grammatically defined negator or negation word;
    obtaining a derived semantic attribute or attribute value for the text unit as a whole based on the first term and the second term; and
    performing an action on the text unit based on the derived semantic attribute or attribute value, wherein the action includes extracting the text unit for display or storage, marking the text unit for display in a format that is different from the display format of the text elements adjacent to the text unit in the text content, or displaying the text unit in a format that is different from the display format of the text elements adjacent to the text unit in the text content;
    wherein the steps for obtaining the derived semantic attribute or attribute value for the text unit as a whole include the following:
    receiving a name or description of a semantic attribute, wherein the embodiment of the semantic attribute includes an attribute name or description, an attribute type or attribute value, wherein the semantic attribute comprises a first value and a second value each representing a meaning carried by a term in the language, wherein an example of the semantic attribute comprises a sentiment or opinion, and when the semantic attribute is a sentiment or opinion, each of the first value and the second value is either a positive value or a negative value, but not a neutral value;
    identifying the first term in the text unit, wherein the first term is associated with the first value;
    identifying the second term in the text unit, wherein the second term is associated with the second value;
    determining the derived semantic attribute or attribute value for the text unit as a whole based on the first term and the second term, and the first value and the second value.

2. The method of claim 1, wherein the first value represents a meaning that is in contrast with or opposite to the meaning represented by the second value.

3. The method of claim 1, when the semantic attribute is a sentiment or opinion carried by a word or phrase, and the first value is negative and the second value is also negative, the derived semantic attribute or attribute value associated with the text unit as a whole is determined to be positive.

4. The method of claim 1, further comprising:
    identifying a grammatical attribute associated with the first term or with the second term, wherein the grammatical attribute includes at least the grammatical roles of a subject, an object, a head, a modifier, and parts of speech of a noun, a verb, a preposition, an adjective, and adverb, wherein the derived semantic attribute or attribute value is derived based on the grammatical attribute.

5. The method of claim 4, further comprising:
    identifying a first grammatical attribute associated with the first term, and a second grammatical attribute associated with the second term, wherein the derived semantic attribute or attribute value is derived based on the first grammatical attribute and the second grammatical attribute.

6. The method of claim 5, wherein the first term is a verb, and the second term is a noun that is an object of the verb, or the second term is a verb, and the first term is a noun that is a subject of the verb.

7. The method of claim 5, wherein the first term is a noun and the second term is also a noun; or
    wherein the text unit further comprises a third term associated with the parts of speech of a preposition, and the preposition connects the first term and the second term, and the text unit has a noun+preposition+noun structure; or
    wherein the first term is an adjective and the second term is a noun, and the text unit has an adjective+noun structure; or
    wherein the first term is an adjective and the second term is a noun, and the text unit further comprises a third term having the parts of speech of a preposition, and the preposition connects the adjective and the noun, and the text unit has an adjective+preposition+noun structure; or wherein the first term is an adjective and the second term is a verb, and the adjective and the verb in the text unit is connected by a preposition in the form of adjective+preposition+verb.

8. The method of claim 5, wherein the first term is associated with the grammatical attribute of a subject, and the second term is associated with the grammatical attribute of an adjective predicative, wherein the subject and the adjective is connected by a linking verb in the form of subject+linking verb+adjective.

9. A method implemented on a computer comprising a processor, and for performing actions on a multi-term text unit based on a derived semantic attribute or attribute value, the method comprising:

receiving a text content comprising multiple text units, each text unit comprising at least a portion of a phrase or a sentence consisting of multiple terms, each term comprising a word or a phrase in a language;

identifying, in the text content, a text unit, wherein the text unit comprises a first term and a second term;

obtaining a derived semantic attribute or attribute value for the text unit as a whole based on the first term and the second term, wherein an example of the derived semantic attribute or attribute value comprises at least a positive or negative sentiment or opinion value; and performing an action on the text unit based on the derived semantic attribute or attribute value, wherein the action includes extracting the text unit for display or storage, marking the text unit for display in a format that is different from the display format of the text elements adjacent to the text unit in the text content, or displaying the text unit in a format that is different from the display format of the text elements adjacent to the text unit in the text content;

wherein the steps for obtaining the derived semantic attribute or attribute value for the text unit as a whole include the following:

identifying a first semantic attribute and a second semantic attribute, wherein the embodiments of the first semantic attribute and the second semantic attribute include an attribute name or description, a meaning carried by one or more terms in the language, an attribute type or attribute value, wherein neither the first semantic attribute nor the second semantic attribute refers to a positive or negative sentiment or opinion value;

identifying the first term in the text unit, wherein the first term is associated with the first semantic attribute, or is associated with a label indicating the first semantic attribute, or is a member of a first group of terms in which at least some of the terms are associated with the first semantic attribute;

identifying the second term in the text unit, wherein the second term is associated with the second semantic attribute, or is associated with a label indicating the second semantic attribute, or is a member of a second group of terms in which at least some of the terms are associated with the second semantic attribute;

determining the derived semantic attribute or attribute value for the text unit as a whole based on the first term and the second term, and the first semantic attribute and the second semantic attribute.

10. The method of claim 9, wherein the first semantic attribute and the second semantic attribute represent a meaning referring to a process or action, wherein the process or action includes at least the process or action of increasing or decreasing, or adding or subtracting, or becoming more or becoming less.

11. The method of claim 9, wherein the first term or the second term is further associated with a sentiment or opinion value, wherein the sentiment or opinion value includes a positive or negative sentiment or opinion value.

12. The method of claim 9, further comprising:

identifying a grammatical attribute associated with the first term or with the second term, wherein the grammatical attribute includes at least the grammatical roles of a subject, an object, a head, a modifier, and parts of speech of a noun, a verb, a preposition, an adjective, and adverb, wherein the derived semantic attribute or attribute value is determined based on the grammatical attribute.

13. The method of claim 12, further comprising:

identifying a first grammatical attribute associated with the first term, and a second grammatical attribute associated with the second term, wherein the derived semantic attribute or attribute value is determined based on the first grammatical attribute and the second grammatical attribute.

14. The method of claim 13, wherein the first term is a verb, and the second term is a noun that is an object of the verb, or the second term is a verb, and the first term is a noun that is a subject of the verb.

15. The method of claim 13, wherein the first term is a noun and the second term is also a noun; or wherein the text unit further comprises a third term associated with the parts of speech of a preposition, and the preposition connects the first term and the second term, and the text unit has a noun+preposition+noun structure; or wherein the first term is an adjective and the second term is a noun, and the text unit has an adjective+noun structure; or wherein the first term is an adjective and the second term is a noun, and the text unit further comprises a third term having the parts of speech of a preposition, and the preposition connects the adjective and the noun, and the text unit has an adjective+preposition+noun structure; or wherein the first term is an adjective and the second term is a verb, and the adjective and the verb in the text unit is connected by a preposition in the form of adjective+preposition+verb.

16. The method of claim 13, wherein the first term is associated with the grammatical attribute of a subject, and the second term is associated with the grammatical attribute of an adjective predicative, wherein the subject and the adjective is connected by a linking verb in the form of subject+linking verb+adjective.

17. A method implemented on a computer comprising a processor, and for performing actions on a multi-term text unit based on a derived semantic attribute or attribute value, the method comprising:

receiving a text content comprising multiple text units, each text unit comprising at least a portion of a phrase or a sentence consisting of multiple terms, each term comprising a word or a phrase in a language;

identifying, in the text content, a text unit, wherein the text unit comprises a first term and a second term, wherein neither the first term nor the second term includes a grammatically defined negator or negation word of the language;

obtaining a derived semantic attribute or attribute value for the text unit as a whole based on the first term and the second term, wherein the derived semantic attribute or attribute value includes at least a positive or negative sentiment or opinion value; and performing an action on the text unit based on the derived semantic attribute or attribute value, wherein the action includes extracting the text unit for display or storage, marking the text unit for display in a format that is different from the display format of the text elements adjacent to the text unit in the text content, or displaying the text unit in a format that is different from the display format of the text elements adjacent to the text unit in the text content;

wherein the steps for obtaining the derived semantic attribute or attribute value for the text unit as a whole include the following:

identifying a first semantic attribute, wherein the embodiments of the first semantic attribute include an attribute name or description, a meaning carried by one or more terms in the language, an attribute type or attribute value, wherein the first semantic attribute is not a positive or negative sentiment or opinion value;

identifying the first term in the text unit, wherein the first term is associated with the first semantic attribute, or is associated with a label indicating the first semantic attribute, or is a member of a first group of terms in which a least some of the terms are associated with the first semantic attribute;

identifying the second term in the text unit, wherein the second term is associated with a positive or negative sentiment or opinion value;

determining the derived semantic attribute or attribute value for the text unit as a whole based on the first semantic attribute associated with the first term and the positive or negative sentiment or opinion value associated with the second term, wherein the derived semantic attribute or attribute value is a sentiment or opinion value that is different or opposite to the sentiment or opinion value associated with the second term.

18. The method of claim 17, when the second term is associated with a positive value, the derived semantic attribute or attribute value is negative; when the second term is associated with a negative value, the derived semantic attribute or attribute value is positive.

19. The method of claim 17, wherein the first semantic attribute represents a meaning referring to a process or action, wherein the process or action includes at least the process or action of increasing or decreasing, or adding or subtracting, or becoming more or becoming less.

20. The method of claim 17, further comprising:

identifying a grammatical attribute associated with the first term or with the second term, wherein the grammatical attribute includes at least the grammatical roles of a subject, an object, a head, a modifier, and parts of speech of a noun, a verb, a preposition, an adjective, and adverb, wherein the derived semantic attribute or attribute value is determined based on the grammatical attribute.

* * * * *